US009073454B2

(12) United States Patent
Shinbori et al.

(10) Patent No.: US 9,073,454 B2
(45) Date of Patent: Jul. 7, 2015

(54) VEHICLE

(71) Applicant: YAMAHA HATSUDOKI KABUSHIKI KAISHA, Iwata-shi, Shizuoka (JP)

(72) Inventors: Masahide Shinbori, Shizuoka (JP); Masayuki Kubo, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 14/178,730

(22) Filed: Feb. 12, 2014

(65) Prior Publication Data

US 2014/0225358 A1  Aug. 14, 2014

Related U.S. Application Data

(60) Provisional application No. 61/764,682, filed on Feb. 14, 2013.

(51) Int. Cl.
*B60N 3/02* (2006.01)
*B62D 23/00* (2006.01)

(52) U.S. Cl.
CPC ........ *B60N 3/02* (2013.01); *B60N 3/026* (2013.01); *B62D 23/005* (2013.01)

(58) Field of Classification Search
CPC .......... B60N 3/02; B60N 3/026; B25G 1/102; B25G 1/00
USPC .................................. 296/1.02, 71; 16/110.1
See application file for complete search history.

(56) References Cited

U.S. PATENT DOCUMENTS

| 5,251,713 | A | * | 10/1993 | Enokimoto ................. 180/68.4 |
| 7,795,602 | B2 | * | 9/2010 | Leonard et al. ............ 250/495.1 |
| D636,295 | S | * | 4/2011 | Eck et al. ......................... D12/1 |
| 2008/0184475 | A1 | * | 8/2008 | Sladick et al. ................ 4/576.1 |
| 2009/0071737 | A1 | * | 3/2009 | Leonard et al. .............. 180/68.4 |
| 2009/0184531 | A1 | | 7/2009 | Yamamura et al. |
| 2010/0326757 | A1 | * | 12/2010 | Leonard et al. .............. 180/90.6 |
| 2012/0031693 | A1 | * | 2/2012 | Deckard et al. .............. 180/68.3 |
| 2012/0217078 | A1 | * | 8/2012 | Kinsman et al. ............. 180/69.4 |
| 2012/0248395 | A1 | * | 10/2012 | Stark et al. ....................... 256/59 |
| 2013/0033070 | A1 | * | 2/2013 | Kinsman et al. ......... 296/190.03 |
| 2013/0256050 | A1 | * | 10/2013 | Novotny et al. .............. 180/271 |
| 2014/0103627 | A1 | * | 4/2014 | Deckard et al. ............... 280/807 |

FOREIGN PATENT DOCUMENTS

WO  2008/115463 A1  9/2008

OTHER PUBLICATIONS

Deckard et al., Side-by-side Vehicle, Oct. 11, 2012, U.S. Appl. No. 61/712,396, Specification.*
Deckard et al., Side-by-side Vehicle, Oct. 11, 2012, U.S. Appl. No. 61/712,396, Drawings.*

* cited by examiner

*Primary Examiner* — James English
(74) *Attorney, Agent, or Firm* — Keating & Bennett, LLP

(57) ABSTRACT

A vehicle includes a pair of front wheels, a pair of rear wheels, a frame portion, a first seat portion, a second seat portion, a third seat portion, a steering wheel, and a grab bar. The first seat portion, the second seat portion and the third seat portion are supported by the frame portion and are disposed side by side in this order in a width direction of the vehicle. The steering wheel is in front of the first seat portion. The grab bar is on a side closer to the third seat portion in the width direction of the vehicle when viewed from the steering wheel. The grab bar includes a first grip portion in front of the second seat portion.

19 Claims, 22 Drawing Sheets

F I G. 1
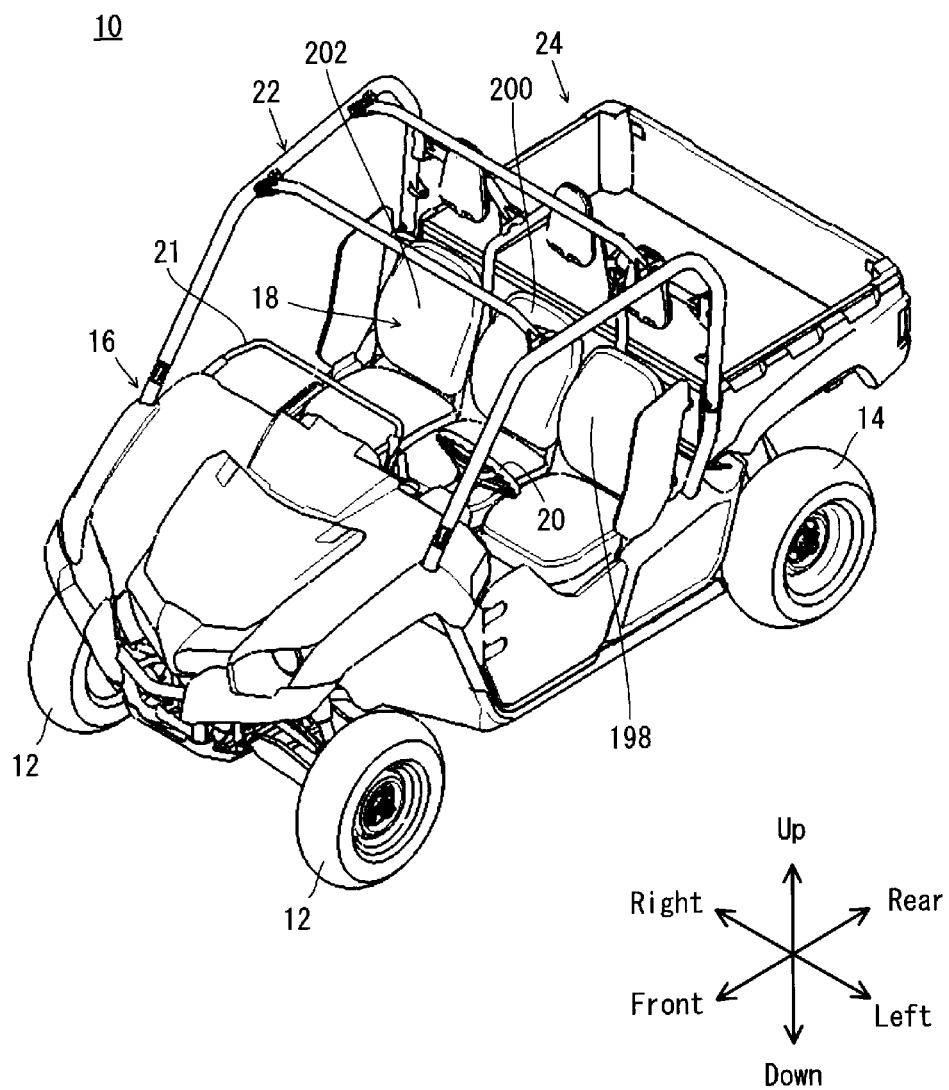

VEHICLE

BACKGROUND OF THE INVENTION

1. Field of the Invention

The present invention relates to vehicles, and more specifically to a vehicle including a grab bar.

2. Description of the Related Art

Conventionally, there is proposed a variety of off-road vehicles (e.g., Recreational Off-Highway Vehicles (ROVs)). For example, WO2008/115463A1 discloses a vehicle including a plurality of wheels, a frame supported by the plurality of wheels, and a pair of seats (a driver's seat and a passenger's seat) supported by the frame. A steering wheel is in front of the driver's seat, whereas a grab bar is in front of the passenger's seat.

Such a vehicle as described above sometimes includes two or more passengers' seats so that the vehicle can carry an increased number of passengers. For increasing the number of passenger's seats, the vehicle disclosed in WO2008/115463A1, for example, may include an additional passenger's seat disposed between the driver's seat and the passenger's seat. In this case, however, the passenger who sits in the center passenger's seat has to grab the grab bar which is in front of the other passenger's seat. Because of this, the passenger sitting in the center seat cannot hold the grab bar in a relaxed posture and therefore it is difficult for him/her to reduce his/her sway. As a result, riding comfort of the passenger sitting in the center seat is likely to be reduced.

SUMMARY OF THE INVENTION

Therefore, preferred embodiments of the present invention provide a vehicle in which a passenger sitting in a center seat can reduce or prevent his/her sway.

According to a preferred embodiment of the present invention, a vehicle includes a pair of front wheels; at least a pair of rear wheels; a frame portion supported by the pair of front wheels and the pair of rear wheels; a first seat portion, a second seat portion and a third seat portion supported by the frame portion and disposed side by side in this order in a width direction of the vehicle; a steering wheel in front of the first seat portion; and a grab bar on a side closer to the third seat portion in the width direction of the vehicle when viewed from the steering wheel. With this arrangement, the grab bar includes a first grip portion in front of the second seat portion.

According to a preferred embodiment of the present invention, the first grip portion is in front of the second seat portion. Therefore, the passenger sitting in the second seat portion can easily grab the first grip portion. Thus, even if the vehicle undergoes a rocking motion, the passenger sitting in the second seat portion can grab the first grip portion so as to reduce or prevent his/her sway. As a result, the passenger sitting in the second seat portion enjoys a comfortable ride.

Preferably, the vehicle further includes a display device in front of the second seat portion to display information about the traveling state of the vehicle; the display device includes an upper end located at a lower position than an upper end of the steering wheel; and the first grip portion is at a lower position than the upper end of the display device. In this case, since the upper end of the display device is at a lower position than the upper end of the steering wheel, the driver sees the display device from an obliquely upper position. On the other hand, the first grip portion is also at a lower position than the upper end of the display device, so this arrangement makes it possible to prevent the first grip portion from becoming obstructive when the driver looks at the display device.

Further preferably, the grab bar further includes a first mounting portion attached to the frame portion in front of the second seat portion, and a connecting portion connecting the first grip portion and the first mounting portion to each other. With this arrangement, the first mounting portion is at a lower position than the first grip portion. In this case, since the first mounting portion is at a lower position than the first grip portion, it is possible to position at least a portion of the connecting portion at a lower position than the first grip portion. Therefore, it is possible to position at least a portion of the connecting portion at a lower position than the upper end of the display device so that the grab bar will not become obstructive when the driver looks at the display device.

Further, preferably, the first grip portion has its rear end at a more rearward position than a center of the steering wheel. In this case, the driver's arm and hand on the steering wheel are prevented from contacting with the passenger's arm and hand on the first grip portion. This provides the driver with undisturbed operation of the vehicle, while it also provides a more comfortable ride to the passenger sitting in the seat portion.

Preferably, the first grip portion has its upper end at a lower position than the center of the steering wheel. In this case, the driver's arm and hand on the steering wheel are prevented from contacting with the passenger's arm and hand on the first grip portion. This provides the driver with undisturbed operation of the vehicle, while it also provides a more comfortable ride to the passenger sitting in the seat portion.

Further preferably, at least a portion of the first grip portion is on a side closer to the third seat portion than a center line of the second seat portion in the width direction. In this case, the passenger sitting in the second seat portion can grab a portion of the first grip portion which is on the side closer to the third seat portion than the center line of the seat portion in the width direction. Thus, the driver's arm and hand on the steering wheel are prevented from contacting with the passenger's arm and hand on the first grip portion. As a result, the invention provides the driver with undisturbed operation of the vehicle, while it also provides a more comfortable ride to the passenger sitting in the second seat portion.

Further, preferably, the first grip portion has its center on a side closer to the third seat portion than the center line of the second seat portion in the width direction. In this case, the passenger's arm and hand grabbing the first grip portion is on a side closer to the third seat portion, such that the driver's arm and hand on the steering wheel are prevented from contacting with the passenger's arm and hand on the first grip portion.

Preferably, the grab bar further includes a second grip portion in front of the third seat portion, and the second grip portion is at a higher position than the first grip portion. In this case, sufficient space is provided below the second grip portion. This provides an advantage such that the second grip portion is not obstructive when a passenger is getting on the vehicle from the side of the third seat portion to sit in the second seat portion, for example. Likewise, the second grip portion is not obstructive when the passenger leaves the second seat portion and passes by the third seat portion to get off the vehicle. As a result, the passenger can easily get on/off the vehicle when sitting in/leaving from the second seat portion. Also, since the first grip portion and the second grip portion are at different heights from each other, this arrangement prevents the passenger's arm and hand on the first grip portion from contacting with the other passenger's arm and hand on the second grip portion. This provides a more comfortable ride to passengers sitting in the second seat portion and the third seat portion.

Further preferably, the grab bar further includes a first mounting portion attached to the frame portion, and a second mounting portion disposed on a side away from the steering wheel in the width direction of the vehicle when viewed from the first mounting portion and is attached to the frame portion. With this arrangement, the second mounting portion is at a higher position than the first mounting portion. In this case, it is possible to attach the grab bar to the frame portion at least at two locations (the first mounting portion and the second mounting portion) thereof. This arrangement allows the grab bar to be fixed strongly to the frame portion. Also, the second mounting portion is on a side spaced away from the steering wheel when viewed from the first mounting portion, and is at a higher position than the first mounting portion. This arrangement prevents the second mounting portion from being obstructive to a passenger who is trying to get on/off the vehicle from the side of the third seat portion. This makes it easier for the passenger to get on/off the vehicle.

Further, preferably, the grab bar further includes a second grip portion in front of the third seat portion, and the first grip portion is at a more rearward position than the second grip portion. In this case, since the first grip portion and the second grip portion are at different positions from each other in a fore-aft direction, this arrangement prevents the passenger's arm and hand on the first grip portion from contacting with the other passenger's arm and hand on the second grip portion. This provides a more comfortable ride to passengers sitting in the second seat portion and the third seat portion.

Preferably, the grab bar includes a first grab bar including the first grip portion; and a second grab bar including the second grip portion, and the first grab bar and the second grab bar are integrated with each other. In this case, this arrangement makes it possible to provide the first grab bar for the second seat portion and the second grab bar for the third seat portion while reducing complications of the vehicle configuration.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 1 is a perspective view of a vehicle according to a preferred embodiment of the present invention.

DETAILED DESCRIPTION OF THE PREFERRED EMBODIMENTS

Figure 2:
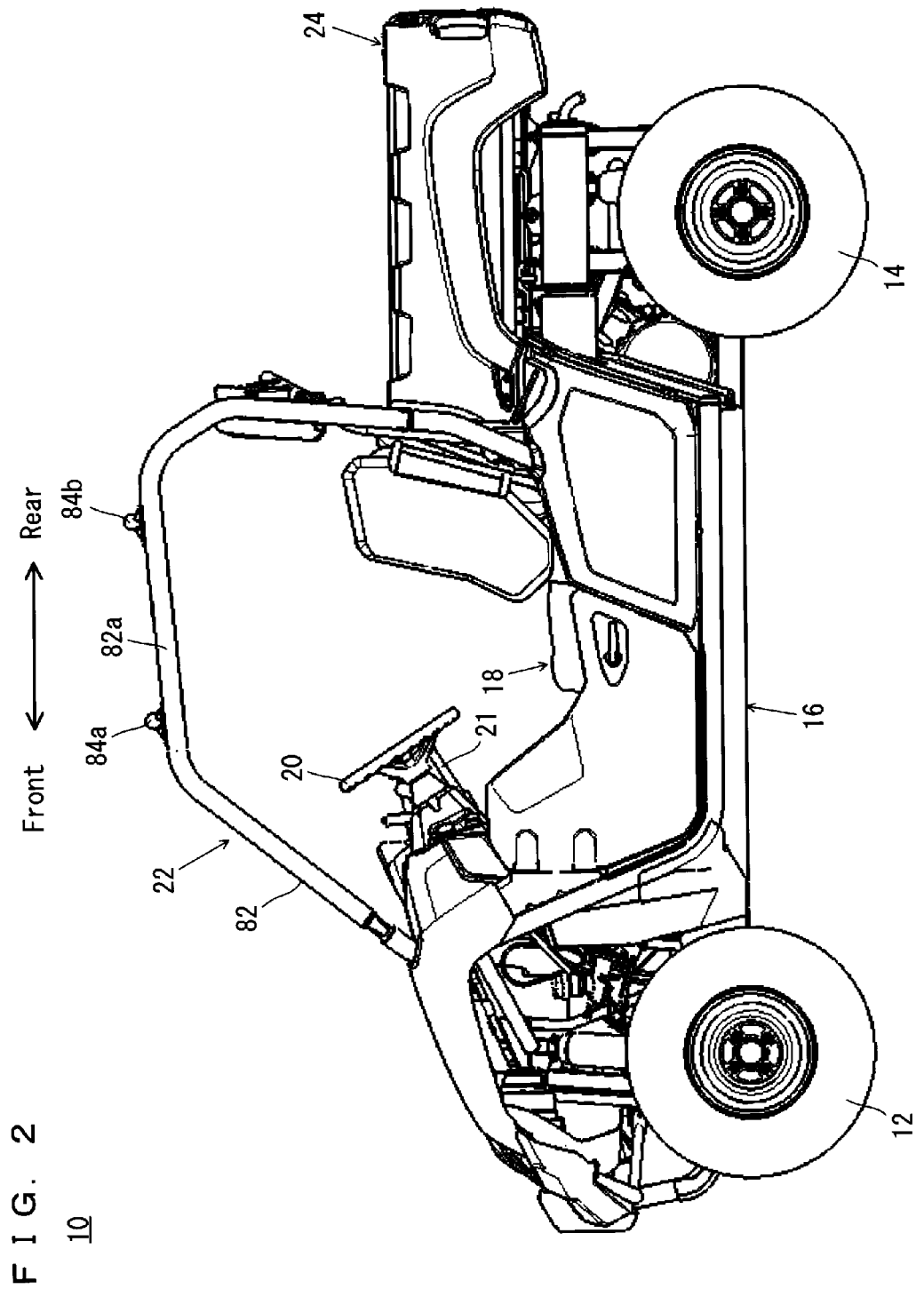
FIG. 2 is a side view of the vehicle.

Hereinafter, preferred embodiments of the present invention will be described with reference to the drawings. It is noted that the terms front and rear, right and left, up and down as used in the preferred embodiments of the present invention are determined from the driver's position on a seat portion 198 of a vehicle 10, with the driver facing toward a steering wheel 20.

Referring to FIG. 1 through FIG. 5, the vehicle 10 according to a preferred embodiment of the present invention preferably is a four-wheel-drive recreational off-highway vehicle (ROV), and includes a pair of front wheels 12, a pair of rear wheels 14, a frame portion 16, a seat unit 18, a steering wheel 20, a grab bar 21, a roll-over protection cage 22 and a cargo bed 24. The frame portion 16 is supported by the pair of front wheels 12 and the pair of rear wheels 14. Referring to FIG. 6, the frame portion 16 includes a main frame portion 16a supported by the pair of front wheels 12 (see FIG. 1) and the pair of rear wheels 14 (see FIG. 1); and a seat frame portion 16b supported by the main frame portion 16a. The seat unit 18 is supported by the seat frame portion 16b.

Figure 7:
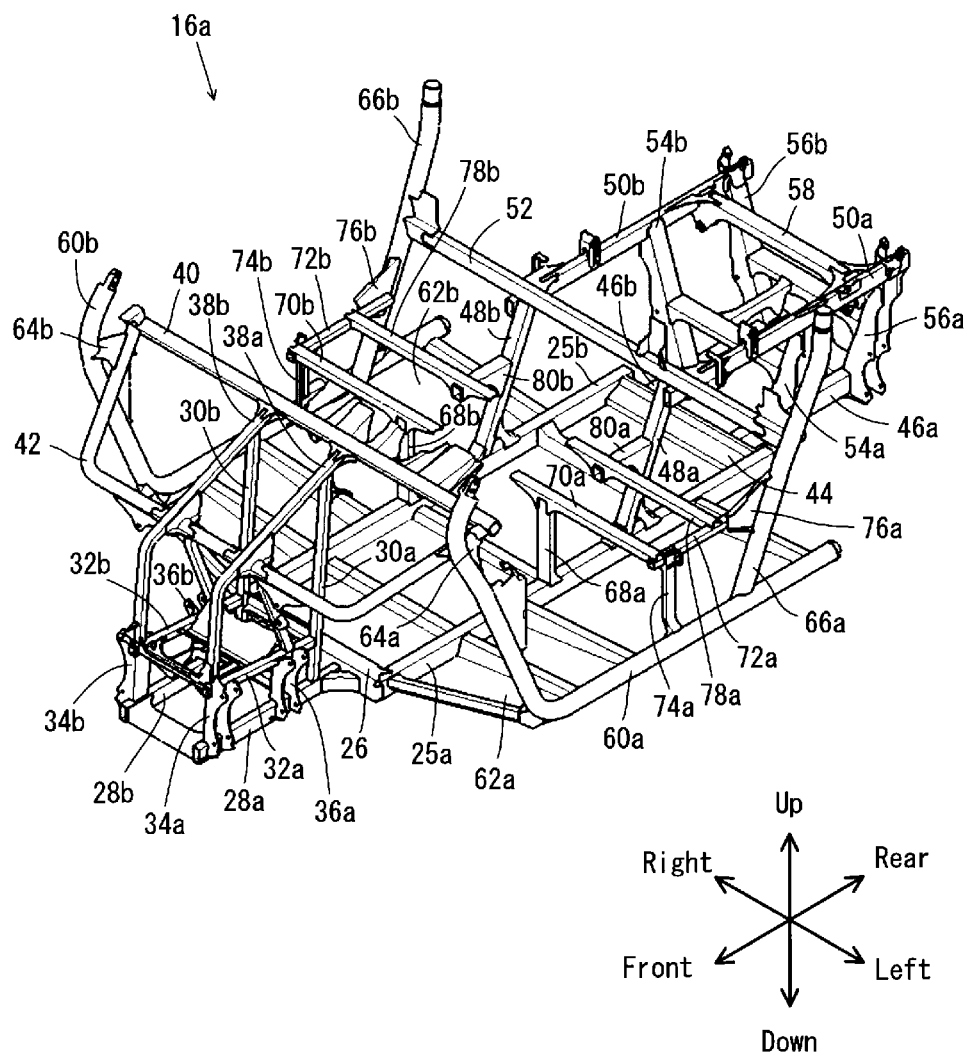
FIG. 7 is a perspective view of a main frame portion.

Referring to FIG. 7, the main frame portion 16a includes a pair of side frame portions 25a, 25b extending in a fore-aft direction. The side frame portion 25a and the side frame portion 25b are parallel or substantially parallel to each other. The side frame portion 25a and the side frame portion 25b have their respective forward ends connected to each other by a cross member 26 extending in a left-right direction (a width direction of the vehicle 10).

From the cross member 26, a pair of side frame portions 28a, 28b extend forward. In the width direction of the vehicle 10, the side frame portions 28a, 28b are on an inner side than the side frame portions 25a, 25b. The side frame portion 28a and the side frame portion 28b are parallel or substantially parallel to each other. A pair of support frame portions 30a, 30b extend upward from respective rearward regions of the side frame portions 28a, 28b.

Above the side frame portions 28a, 28b, a pair of side frame portions 32a, 32b extend forward from the support frame portions 30a, 30b. The side frame portion 32a and the side frame portion 32b are parallel or substantially parallel to each other.

The side frame portions 28a, 28b have their forward end regions connected to respective forward end regions of the side frame portions 32a, 32b by a pair of support frame portions 34a, 34b extending in an up-down direction. The side frame portions 28a, 28b have their rearward regions connected to respective rearward regions of the side frame portions 32a, 32b by a pair of support frame portions 36a, 36b extending in an up-down direction. The support frame portions 36a, 36b are at a more rearward position than the support frame portions 34a, 34b.

The side frame portions 32a, 32b have their forward end regions connected to a pair of support frame portions 38a, 38b. The support frame portions 38a, 38b extend upward from the side frame portions 32a, 32b, and then obliquely in a rearward and upward direction. The support frame portions 30a, 30b have their upper ends connected to respective rearward end regions of the support frame portions 38a, 38b. The support frame portions 38a, 38b have their rear ends connected to a cross member 40 extending in a left-right direction.

From the cross member 40, a U-shaped or substantially U-shaped frame portion 42 extends forward, below the support frame portions 38a, 38b. The U-shaped or substantially U-shaped frame portion 42 includes two end regions connected to respective end regions of the cross member 40. The U-shaped or substantially U-shaped frame portion 42 includes an intermediate portion connected to the support frame portions 38a, 38b.

The side frame portion 25a and the side frame portion 25b have their respective rearward end regions connected to each other by a cross member 44 extending in a left-right direction. From the cross member 44, a pair of side frame portions 46a, 46b extend rearward. In the width direction of the vehicle 10, the side frame portions 46a, 46b are on an inner side than the side frame portions 25a, 25b. The side frame portion 46a and the side frame portion 46b are parallel or substantially parallel to each other.

At a more forward position than the cross member 44, a pair of support frame portions 48a, 48b extend obliquely in an upward and rearward direction from the pair of side frame portions 25a, 25b. At a higher position than the side frame portions 46a, 46b, a pair of side frame portions 50a, 50b extend in a fore-aft direction. The side frame portion 50a and the side frame portion 50b are parallel or substantially parallel to each other. In the width direction of the vehicle 10, the side frame portions 50a, 50b are located farther outward than the side frame portions 46a, 46b. The cargo bed 24 (see FIG. 1) is supported by the side frame portions 50a, 50b. The side frame portions 50a, 50b have their forward end regions connected to respective upper end regions of the support frame portions 48a, 48b. The support frame portions 48a, 48b have their upper ends connected to a cross member 52 extending in a left-right direction.

Referring to FIG. 6 and FIG. 7, the side frame portions 46a, 46b and the side frame portions 50a, 50b are connected to each other by a pair of support frame portions 54a, 54b which extend in an up-down direction and a pair of support frame portions 56a, 56b which extend in an up-down direction. The support frame portions 54a, 54b are at a more forward position than the support frame portions 56a, 56b. The side frame portion 50a and the side frame portion 50b are connected to each other by a cross member 58 extending in a left-right direction. The cross member 58 is at a position which is more rearward than the support frame portions 54a, 54b and more forward than the support frame portions 56a, 56b.

In the width direction of the vehicle 10, there is provided a pair of L-shaped or substantially L-shaped support frame portions 60a, 60b on respective outer sides of the side frame portions 25a, 25b. The support frame portion 60a is connected to the side frame portion 25a via a plate frame portion 62a, whereas the support frame portion 60b is connected to the side frame portion 25b via a plate frame portion 62b.

Referring to FIG. 7, the support frame portions 60a, 60b have their upper regions connected to two end regions of the U-shaped frame portion 42 via connecting members 64a, 64b. A pair of support frame portions 66a, 66b extend obliquely in an upward and rearward direction from rearward regions of the support frame portions 60a, 60b. The support frame portions 66a, 66b have their substantially intermediate regions connected to two end regions of the cross member 52.

A pair of support frame portions 68a, 68b extend upward from substantially intermediate regions of the side frame portions 25a, 25b. A pair of support frame portions 70a, 70b extend in a left-right direction, being supported by upper ends of the support frame portions 68a, 68b. The support frame portion 70a has an end region (left end region in the present preferred embodiment) connected to a forward end region of a support frame portion 72a which extends in a fore-aft direction, whereas the support frame portion 70b has an end region (right end region in the present preferred embodiment) connected to a forward end region of a support frame portion 72b which extends in a fore-aft direction.

The support frame portion 72a has a forward region connected to the support frame portion 60a by a support frame portion 74a which extends in an up-down direction, whereas the support frame portion 72b has a forward region connected to the support frame portion 60b by a support frame portion 74b which extends in an up-down direction. The support frame portion 72a has a rearward region connected to the support frame portion 66a via a connecting member 76a, whereas the support frame portion 72b has a rearward region connected to the support frame portion 66b via a connecting member 76b.

Behind the support frame portion 70a, a support frame portion 78a is parallel or substantially parallel to the support frame portion 70a, whereas behind the support frame portion 70b, a support frame portion 78b is parallel or substantially parallel to the support frame portion 70b. The support frame portion 78a has an end region (left end region in the present preferred embodiment) connected to the support frame portion 72a, whereas the support frame portion 78b has an end region (right end region in the present preferred embodiment) connected to the support frame portion 72b.

A pair of support frame portions 80a, 80b extend forward from substantially intermediate regions of the support frame portions 48a, 48b. The support frame portions 80a, 80b have their forward end regions connected to the support frame portions 78a, 78b.

Referring to FIG. 6 and FIG. 7, the seat unit 18 is supported by the support frame portions 70a, 70b, 78a, 78b of the main frame portion 16a via the seat frame portion 16b. Referring to FIG. 1, the steering wheel 20 is in front of the seat portion 19B, which will be described later, of the seat unit 18. The grab bar 21 is in front of the seat unit 18 next to the steering wheel 20 in the width direction of the vehicle 10. The roll-over protection cage 22 covers the seat unit 18, the steering wheel 20 and the grab bar 21. The roll-over protection cage 22 is supported by the frame portion 16.

Figure 8:
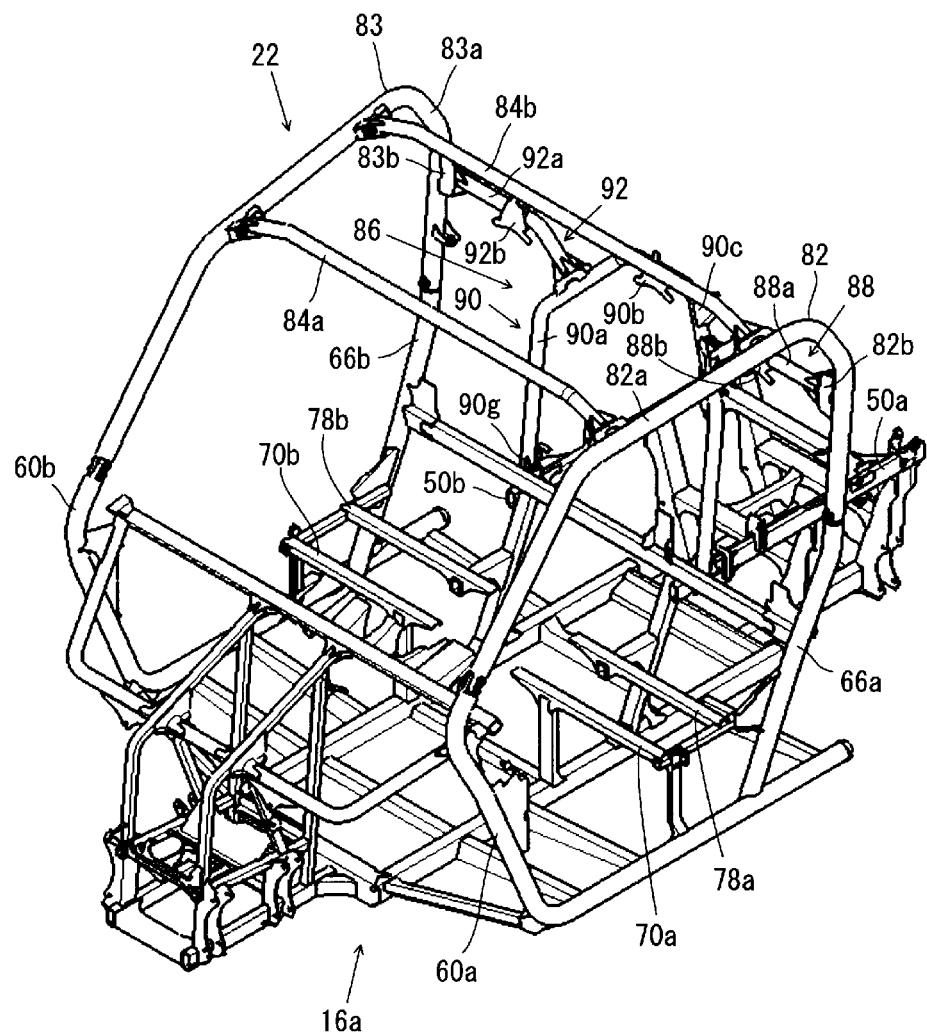
FIG. 8 is a perspective view of the main frame portion and the roll-over protection cage.

Referring to FIG. 8, the roll-over protection cage 22 includes a pair of side cage members 82, 83 extending in a fore-aft direction; a pair of roof members 84a, 84b extending in a left-right direction; and a cross member portion 86 extending in a left-right direction.

The side cage member 82 includes a main body portion 82a which has a shape of an inverted letter of U or a shape substantially of an inverted letter of U, in a side view; and a connecting portion 82b at a rearward region of the main body portion 82a. The connecting portion 82b protrudes inward (rightward in the present preferred embodiment) from the main body portion 82a in the width direction of the vehicle 10. The side cage member 83 includes a main body portion 83a which has a shape of an inverted letter of U or a shape substantially of an inverted letter of U, in a side view; and a connecting portion 83b at a rearward region of the main body portion 83a. The connecting portion 83b protrudes inward (leftward in the present preferred embodiment) from the main body portion 83a in the width direction of the vehicle 10.

The main body portions 82a, 83a are supported by the frame portion 16. More specifically, the main body portion 82a has an end region (forward end region in the present preferred embodiment), which is connected to an upper end region of the support frame portion 60a; and the main body portion 82a has another end region (rearward end region in the present preferred embodiment), which is connected to an upper end region of the support frame portion 66a. The main body portion 82a is fixed to the support frame portions 60a, 66a with, e.g., fasteners (such as bolts and nuts), for example. Likewise, the main body portion 83a has an end region (forward end region in the present preferred embodiment), which is connected to an upper end region of the support frame portion 60b; and the main body portion 83a has another end region (rearward end region in the present preferred embodiment), which is connected to an upper end region of the support frame portion 66b. The main body portion 83a is fixed to the support frame portions 60b, 66b with, e.g., fasteners (such as bolts and nuts), for example.

The roof members 84a, 84b connect an upper region of the side cage member 82 to an upper region of the side cage member 83. The roof member 84b is at a more rearward position than the roof member 84a.

Figure 3:
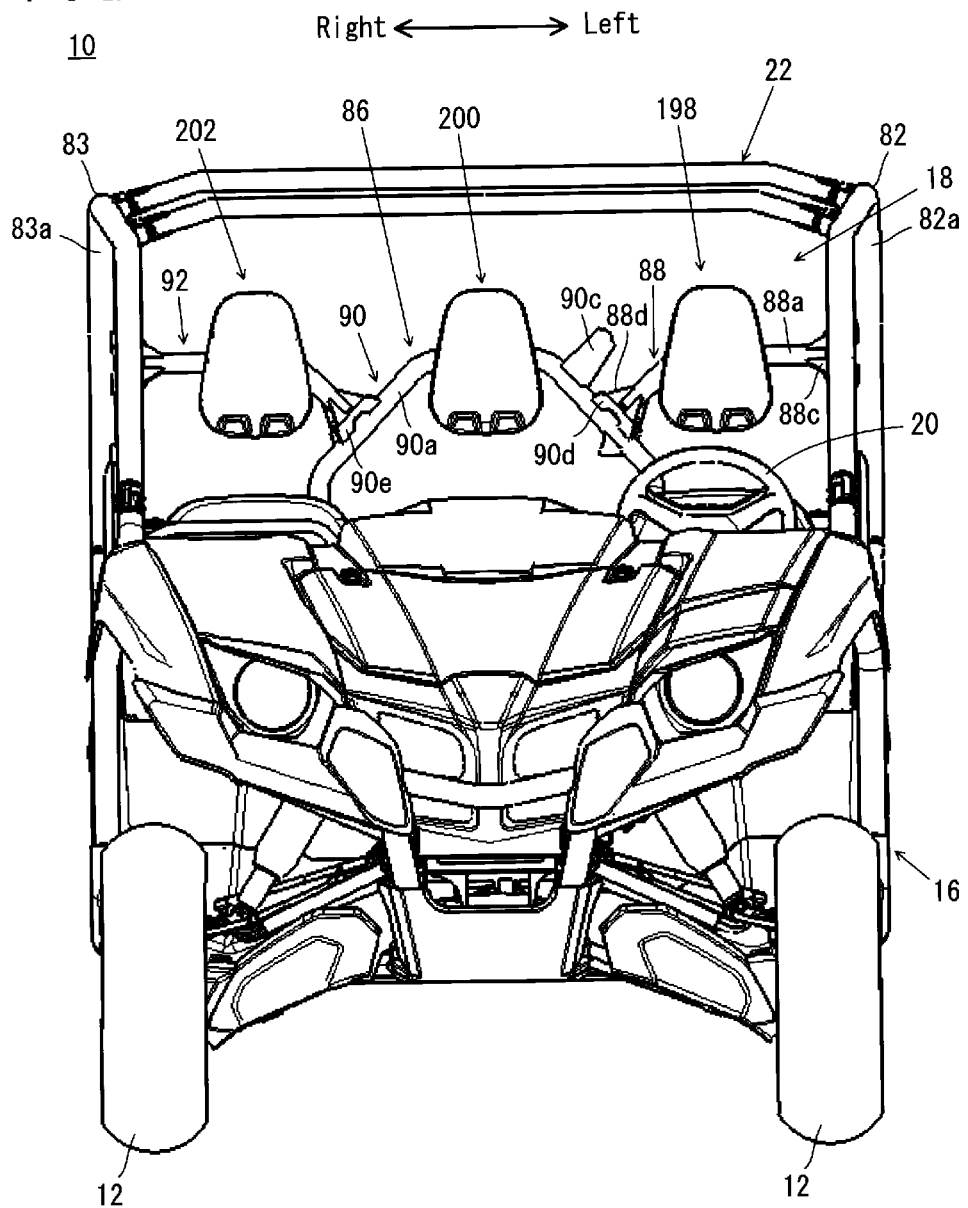
FIG. 3 is a front view of the vehicle.
Figure 5:
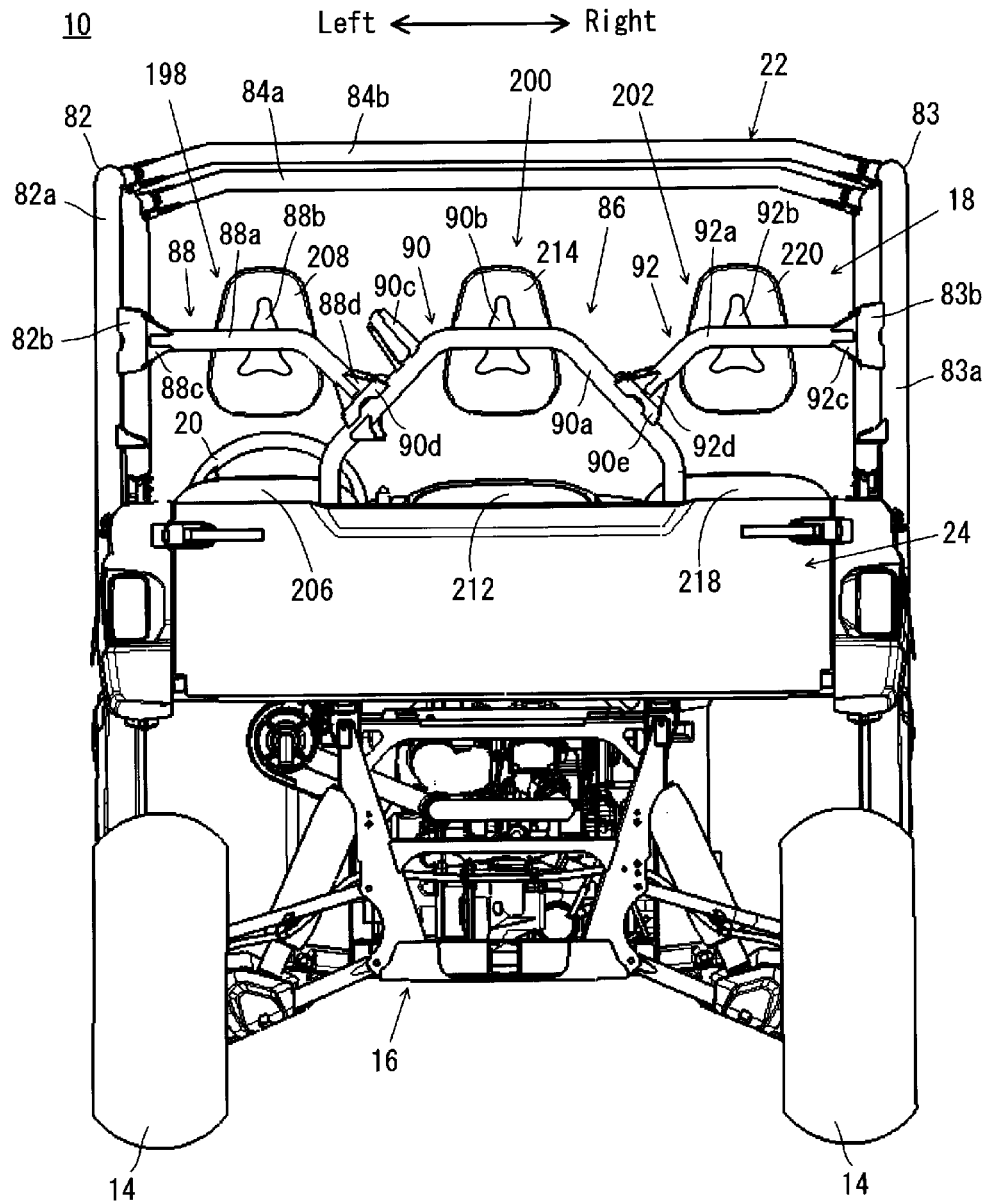
FIG. 5 is a rear view of the vehicle.
Figure 6:
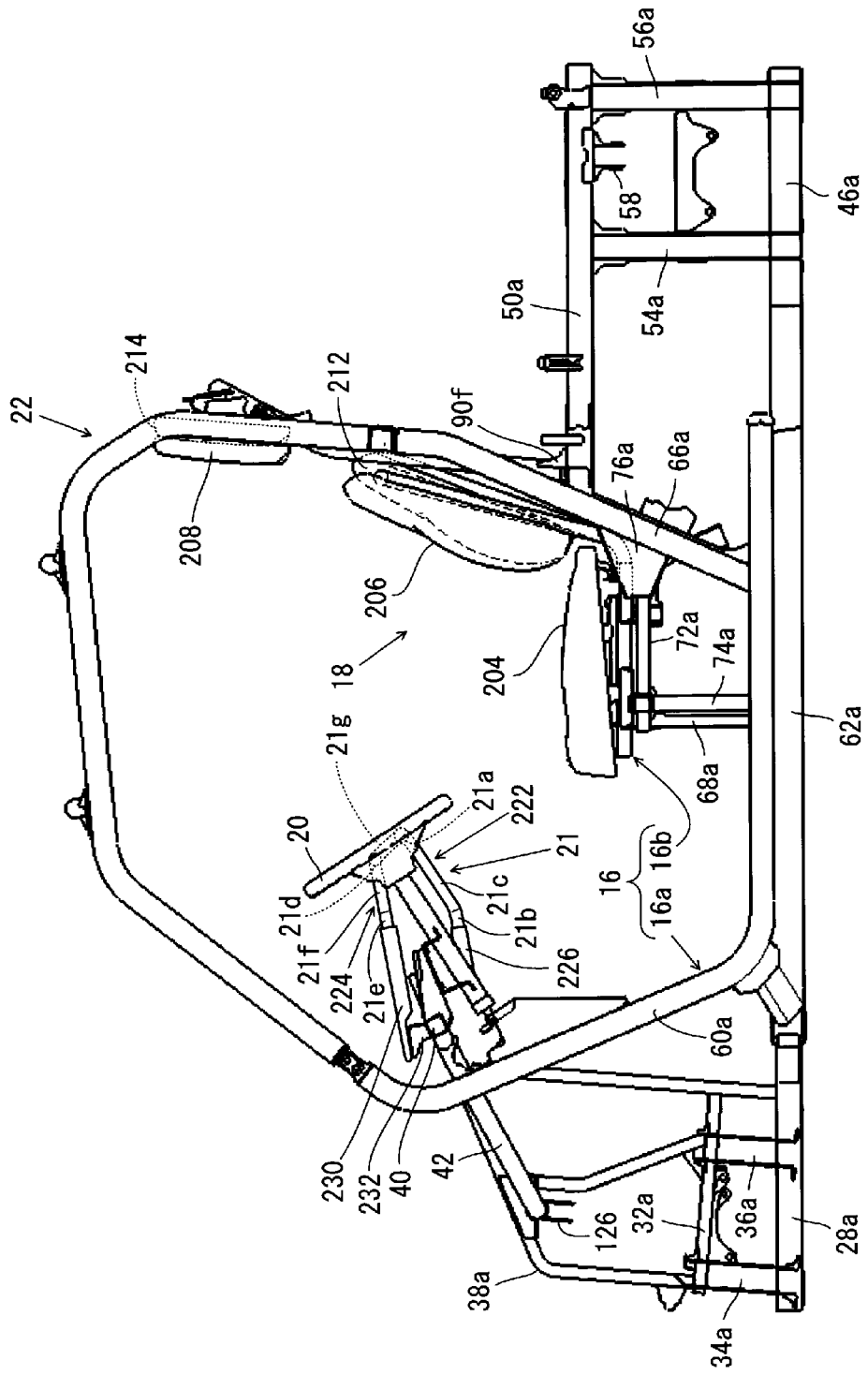
FIG. 6 is a side view showing a frame portion, a seat unit, a steering wheel, a grab bar and a roll-over protection cage.

Referring to FIG. 3, FIG. 5 and FIG. 8, the cross member portion 86 includes a support member 88, a support member and a support member 92. The support member 90 is at an intermediate portion in the width direction of the vehicle 10, the support member 88 connects the support member 90 and the side cage member 82 to each other, and the support member 92 connects the support member 90 and the side cage member 83 to each other.

Referring to FIG. 5, the support member 88 includes a main body portion 88a extending in a left-right direction; a mounting portion 88b fixed to an intermediate region of the main body portion 88a; a connecting portion 88c fixed to an end region (left end region in the present preferred embodiment) of the main body portion 88a; and a connecting portion 88d fixed to another end region (right end region in the present preferred embodiment) of the main body portion 88a. To the mounting portion 88b, a headrest portion 208, which will be described later, of the seat unit 18 is attached. The connecting portion 88c is connected detachably from/attachably to the connecting portion 82b of the side cage member 82. Specifically, the connecting portion 88c is connected to the connecting portion 82b of the side cage member 82 with unillustrated fasteners (such as bolts and nuts) for example. The connecting portion 88d is connected to a connecting portion 90d, which will be described later, of the support member 90 with unillustrated fasteners (such as bolts and nuts), for example.

Figure 4:
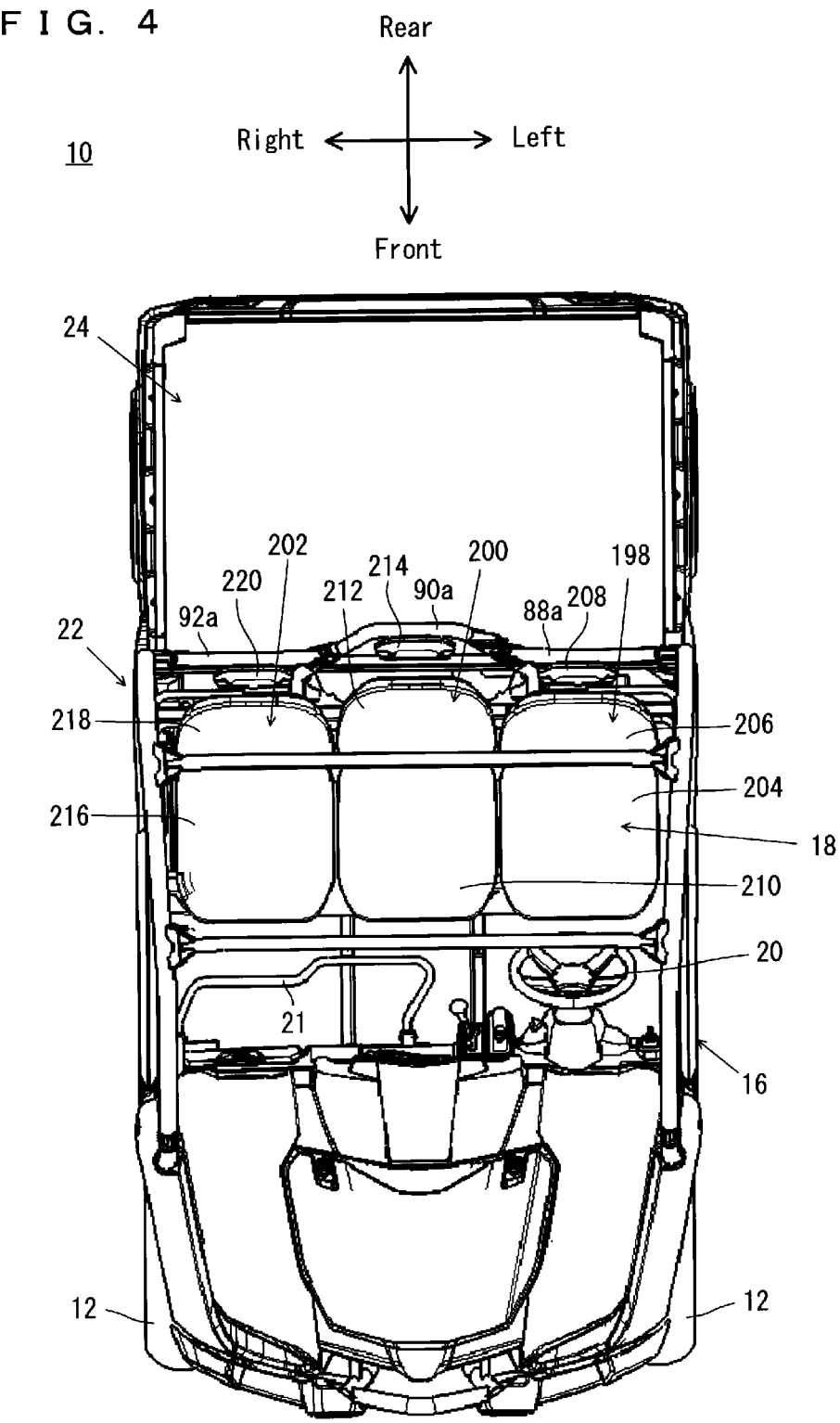
FIG. 4 is a plan view of the vehicle.

Referring to FIG. 5 and FIG. 8, the support member 90 includes a main body portion 90a which has a shape of an inverted letter of U or a shape substantially of an inverted letter of U, in a front view; a mounting portion 90b located at an upper end region, i.e., an intermediate region, of the main body portion 90a; and a mounting portion 90c which extends obliquely upward from the main body portion 90a on a side closer to the support member 88 when viewed from the mounting portion 90b. Referring to FIG. 4, the upper end region of the main body portion 90a is at a more rearward position than the main body portion 88a and a main body portion 92a to be described later. Therefore, referring to FIG. 5 and FIG. 8, the mounting portion 90b is at a more rearward position than the mounting portion 88b and a mounting portion 92b to be described later.

Referring to FIG. 5, a headrest portion 214, which will be described later, of the seat unit 18 is attached to the mounting portion 90b. To the mounting portion 90c, a seat belt unit (not illustrated) for a seat portion 200 which will be described later is attached, for example.

The support member 90 further includes a pair of connecting portions 90d, 90e fixed to the main body portion 90a. The connecting portion 90d is on a side closer to the support member 88 than the mounting portion 90c when viewed from the mounting portion 90b, whereas the connecting portion 90e is on a side closer to the support member 92 when viewed from the mounting portion 90b. As has been described earlier, the connecting portion 90d is connected to the connecting portion 88d of the support member 88. The connecting portion 90e is connected to a connecting portion 92d, which will be described later, of the support member 92 with unillustrated fasteners (such as bolts and nuts), for example.

Referring to FIG. 6 and FIG. 8, the support member 90 further includes a pair of connecting portions 90f, 90g fixed to two end regions of the main body portion 90a. The main body portion 90a includes two end regions connected detachably from/attachably to the side frame portions 50a, 50b via the connecting portions 90f, 90g. Specifically, the connecting portions 90f, 90g of the support member 90 are connected to the side frame portions 50a, 50b with unillustrated fasteners (such as bolts and nuts), for example.

Referring to FIG. 5, the support member 92 includes a main body portion 92a extending in a left-right direction; a mounting portion 92b fixed to an intermediate region of the main body portion 92a; a connecting portion 92c fixed to an end region (right end region in the present preferred embodiment) of the main body portion 92a; and a connecting portion 92d fixed to another end region (left end region in the present preferred embodiment) of the main body portion 92a. A headrest portion 220, which will be described later, of the seat unit 18, is attached to the mounting portion 92b. The connecting portion 92c is connected detachably from/attachably to the connecting portion 83b of the side cage member 83. Specifically, the connecting portion 92c is connected to the connecting portion 83b of the side cage member 83 with unillustrated fasteners (such as bolts and nuts), for example. As has been described earlier, the connecting portion 92d is connected to the connecting portion 90e of the support member 90.

Due to the arrangement described above, the cross member portion 86 is attached detachably from/attachably to the side frame portions 50a, 50b of the frame portion 16 and the side cage members 82, 83 of the roll-over protection cage 22.

Referring to FIG. 9 through FIG. 12, the vehicle 10 further includes a pair of suspension assemblies 94a, 94b which suspend the pair of front wheels 12 (see FIG. 1); a rotation transmission portion 96 which transmits rotation from an engine 178 (see FIG. 13), which will be described later, to the pair of front wheels 12; a pair of suspension assemblies 98a, 98b which suspend the pair of rear wheels 14 (see FIG. 1); a rotation transmission portion 100 which transmits rotation from the engine 178 to the pair of rear wheels 14; and a rear stabilizer 102 which connects the suspension assemblies 98a, 98b to each other. The frame portion 16 (see FIG. 1) is supported by the pair of front wheels 12 and the pair of rear wheels 14 via the suspension assemblies 94a, 94b, 98a, 98b. In the present preferred embodiment, the suspension assemblies 94a, 94b, 98a, 98b preferably are double wishbone type suspension assemblies, for example.

Figure 10:
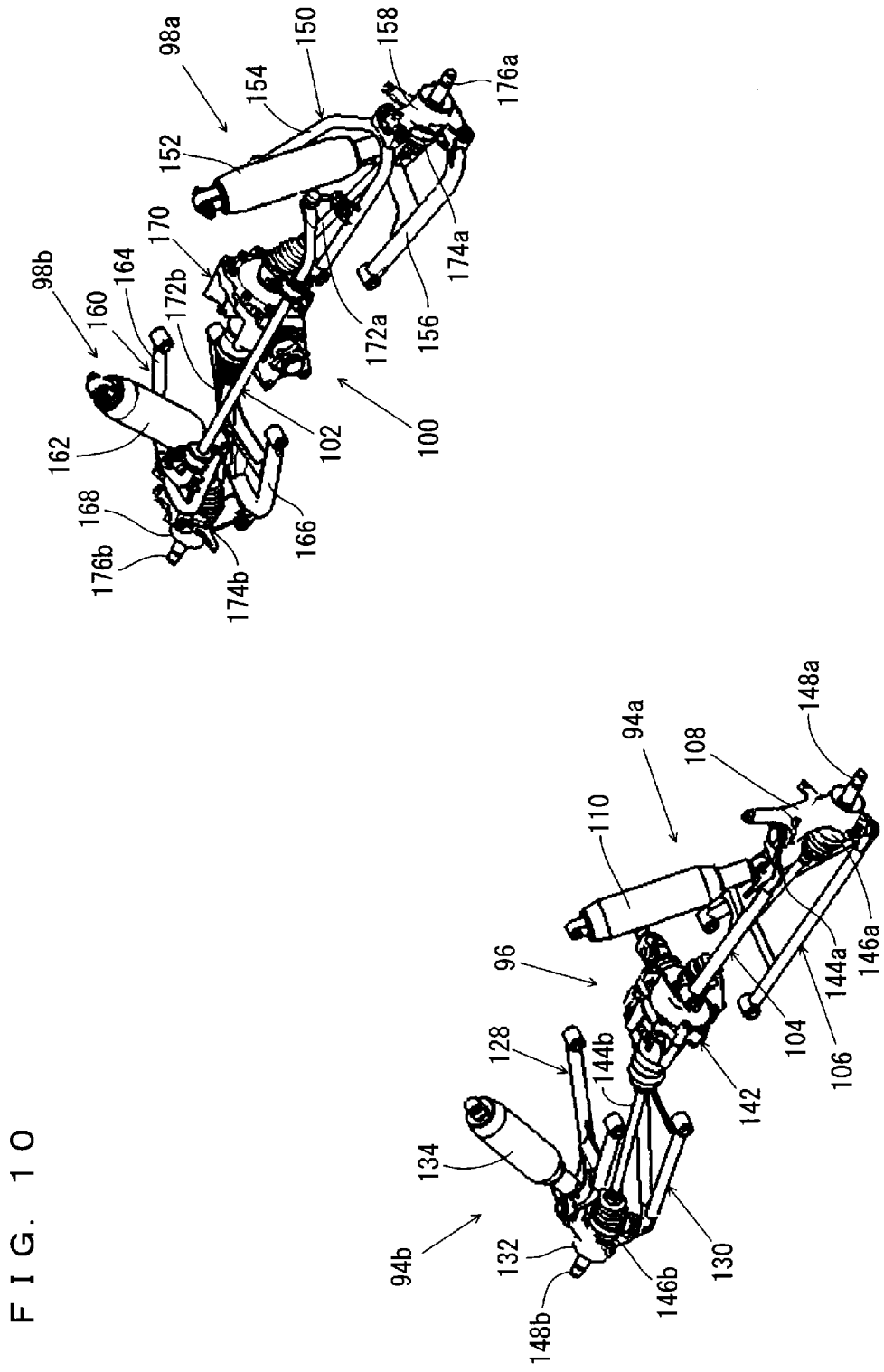
FIG. 10 is a perspective view showing the pair of suspension assemblies for front wheels and the pair of suspension assemblies for rear wheels.
Figure 11:
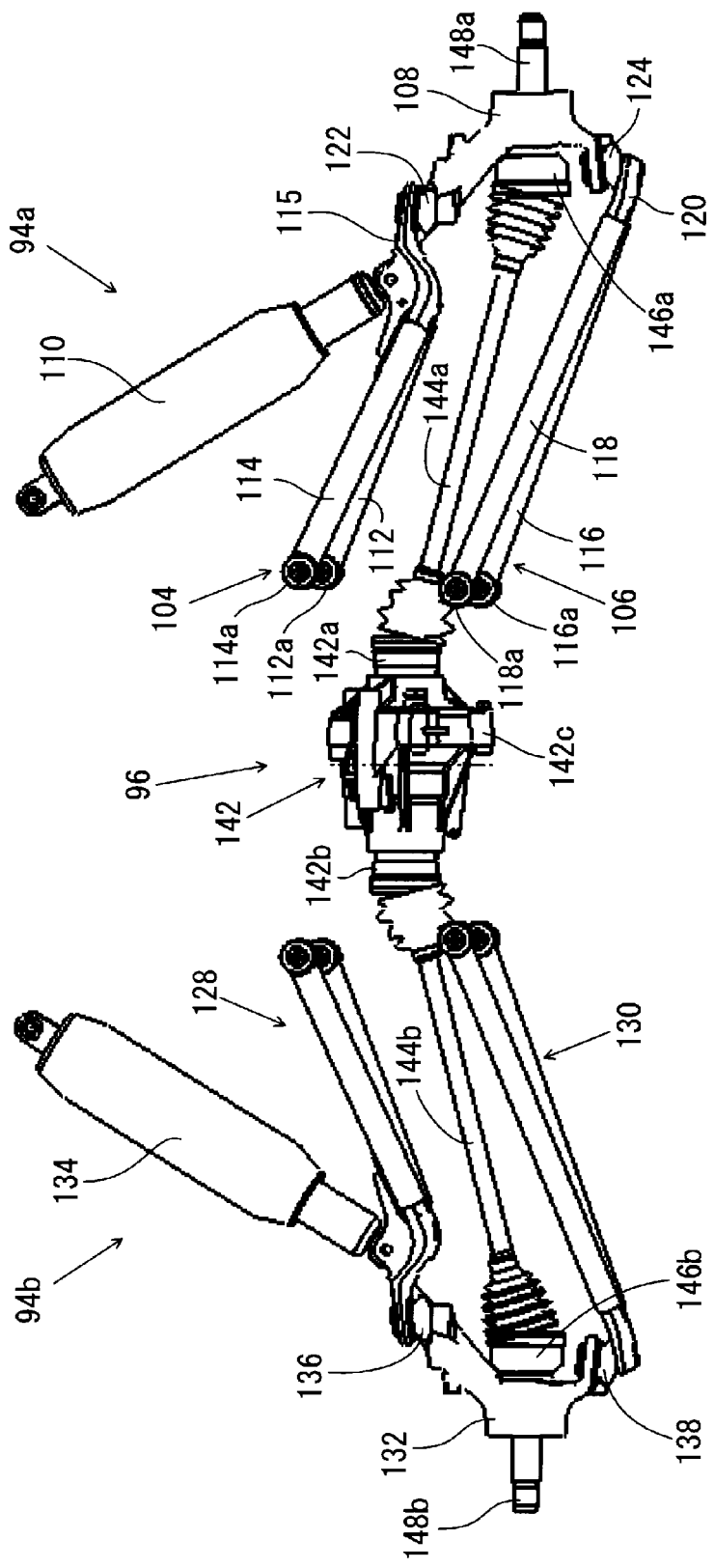
FIG. 11 is a front view showing the pair of suspension assemblies for front wheels and the rotation transmission portion for the front wheels.

Referring to FIG. 10 and FIG. 11, the suspension assembly 94a includes an upper arm 104, a lower arm 106, a knuckle arm 108 and a shock absorber 110. The upper arm 104 and the lower arm 106 are provided by A arms, for example.

Referring to FIG. 11, the upper arm 104 includes a rear arm portion 112 which includes a first end portion 112a; a front arm portion 114 which includes a second end portion 114a and is at a more forward position than the rear arm portion 112; and a connecting portion 115 which connects the rear arm portion 112 and the front arm portion 114 to each other.

The first end portion 112a is an end region (right end region in the present preferred embodiment) of the rear arm portion 112, whereas the second end portion 114a is an end region (right end region in the present preferred embodiment) of the front arm portion 114. The connecting portion 115 connects another end region (left end region in the present preferred embodiment) of the rear arm portion 112 and another end region (left end region in the present preferred embodiment) of the front arm portion 114 to each other.

The lower arm 106 includes a rear arm portion 116 which includes a first end portion 116a; a front arm portion 118 which includes a second end portion 118a and is at a more forward position than the rear arm portion 116; and a connecting portion 120 which connects the rear arm portion 116 and the front arm portion 118 to each other.

The first end portion 116a is an end region (right end region in the present preferred embodiment) of the rear arm portion 116, whereas the second end portion 118a is an end region (right end region in the present preferred embodiment) of the front arm portion 118. The connecting portion 120 connects another end region (left end region in the present preferred embodiment) of the rear arm portion 116 and another end region (left end region in the present preferred embodiment) of the front arm portion 118 to each other.

Figure 9:
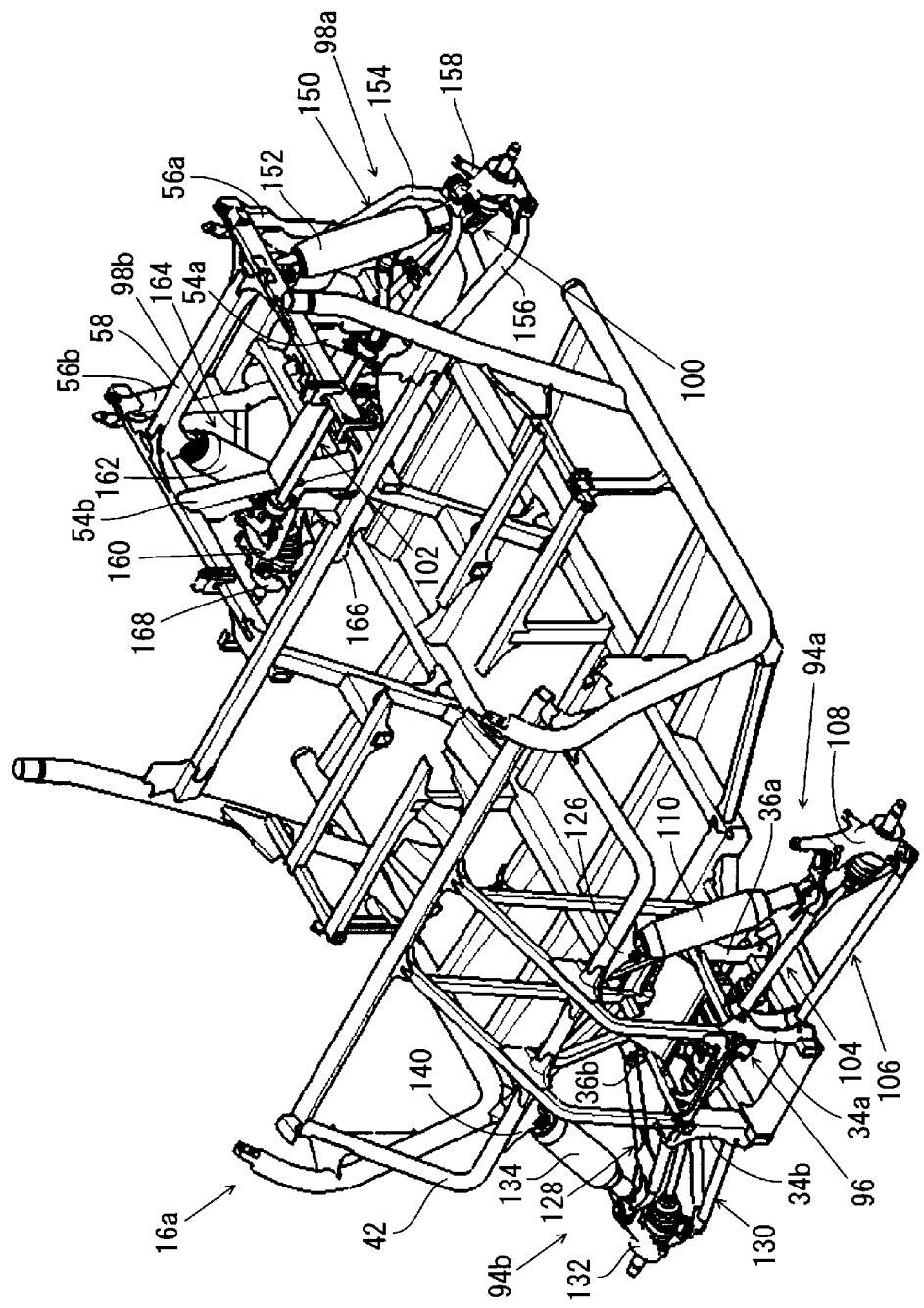
FIG. 9 is a perspective view of the main frame portion, a pair of suspension assemblies for front wheels, a rotation transmission portion for the front wheels, a pair of suspension assemblies for rear wheels, and a rotation transmission portion for the rear wheels.

Referring to FIG. 9, the upper arm 104 is supported by the support frame portions 34a, 36a pivotably in an up-down direction. More specifically, referring to FIG. 11, the first end portion 112a of the rear arm portion 112 is pivotably supported at an upper end region of the support frame portion 36a (see FIG. 9), whereas the second end portion 114a of the front arm portion 114 is pivotably supported at an upper end region of the support frame portion 34a (see FIG. 9).

Referring to FIG. 9, the lower arm 106 is supported by the support frame portions 34a, 36a pivotably in an up-down direction at a lower position than the upper arm 104. More specifically, referring to FIG. 11, the first end portion 116a of the rear arm portion 116 is pivotably supported at a lower end region of the support frame portion 36a (see FIG. 9), whereas the second end portion 118a of the front arm portion 118 is pivotably supported at a lower end region of the support frame portion 34a (see FIG. 9).

The connecting portion 115 of the upper arm 104 is connected to an upper end region of the knuckle arm 108 via a ball joint 122, whereas the connecting portion 120 of the lower arm 106 is connected to a lower end region of the knuckle arm 108 via a ball joint 124. Thus, the upper arm 104 and the lower arm 106 are pivotable in an up-down direction with respect to the knuckle arm 108. Also, the knuckle arm 108 is pivotable in a fore-aft direction with respect to the upper arm 104 and the lower arm 106.

The shock absorber 110 has a lower end region supported pivotably in a left-right direction by the upper arm 104 (the connecting portion 115). Referring to FIG. 9, the shock absorber 110 has an upper end region supported pivotably in a left-right direction by the U-shaped or substantially U-shaped frame portion 42 via a support member 126. Referring to FIG. 6, the support member 126 has a shape of an inverted letter of U in a side view, and is fixed to the U-shaped or substantially U-shaped frame portion 42.

Referring to FIG. 10 and FIG. 11, the suspension assembly 94b is symmetrical to the suspension assembly 94a in a left-right direction, and includes an upper arm 128, a lower arm 130, a knuckle arm 132, and a shock absorber 134. The knuckle arm 132 is connected to the upper arm 128 and the lower arm 130 via ball joints 136, 138.

The shock absorber 134 has a lower end region supported by the upper arm 128 pivotably in a left-right direction. Referring to FIG. 9, the shock absorber 134 has an upper end region supported pivotably in a left-right direction by the U-shaped or substantially U-shaped frame portion 42 via a support member 140. Like the support member 126, the support member 140 has a shape of an inverted letter of U or substantially a shape of an inverted letter of U in a side view, and is fixed to the U-shaped or substantially U-shaped frame portion 42.

Referring to FIG. 10 and FIG. 11, the rotation transmission portion 96 includes a differential device 142, a pair of drive shafts 144a, 144b, a pair of constant-velocity joints 146a, 146b, and a pair of axles 148a, 148b. The differential device 142 is between the suspension assembly 94a and the suspension assembly 94b in the width direction of the vehicle 10. The differential device 142 is supported by the main frame portion 16a. The differential device 142 is connected to the engine 178 (see FIG. 13) which will be described later, via a propeller shaft 180 (see FIG. 13) which will be described later.

Referring to FIG. 11, the differential device 142 includes a pair of constant-velocity joints 142a, 142b and a main body portion 142c. The constant-velocity joint 142a is on a left end region of the main body portion 142c, whereas the constant-velocity joint 142b is on a right end region of the main body portion 142c. The drive shafts 144a, 144b extend in a left-right direction, to connect the constant-velocity joints 142a, 142b with the constant-velocity joints 146a, 146b. More specifically, the drive shaft 144a extends obliquely in a leftwardly downward direction from the constant-velocity joint 142a and is connected to the constant-velocity joint 146a, whereas the drive shaft 144b extends obliquely in a rightwardly downward direction from the constant-velocity joint 142b and is connected to the constant-velocity joint 146b. The drive shaft 144a passes below the upper arm 104 and above the lower arm 106, whereas the drive shaft 144b passes below the upper arm 128 and above the lower arm 130. In the present preferred embodiment, in a front view, the drive shaft 144a passes between the upper arm 104 and the lower arm 106, whereas the drive shaft 144b passes between the upper arm 128 and the lower arm 130.

The constant-velocity joint 146a and the axle 148a are connected to each other and are supported rotatably by the knuckle arm 108. The constant-velocity joint 146b and the axle 148b are connected to each other and are supported rotatably by the knuckle arm 132. The axle 148a supports the left front wheel 12 (see FIG. 1), whereas the axle 148b supports the right front wheel 12 (see FIG. 1).

The suspension assemblies 98a, 98b and the rotation transmission portion 100 can be any known component, so the suspension assemblies 98a, 98b and the rotation transmission portion 100 will be described only briefly.

Figure 12:
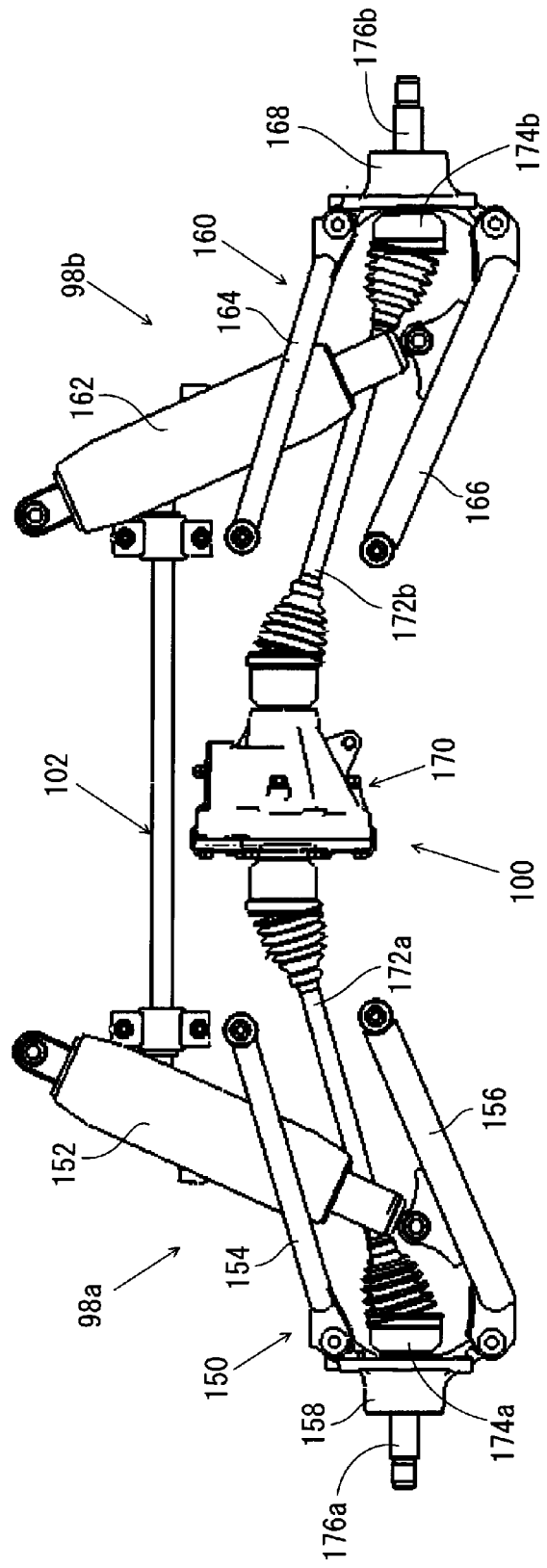
FIG. 12 is a rear view showing the pair of suspension assemblies for rear wheels, the rotation transmission portion for the rear wheels, and a rear stabilizer.

Referring to FIG. 10 and FIG. 12, the suspension assembly 98a includes an arm portion 150 and a shock absorber 152. In the present preferred embodiment, the arm portion 150 includes an upper arm 154, a lower arm 156 and a knuckle arm 158. Referring to FIG. 9, the upper arm 154 is supported by the support frame portions 54a, 56a pivotably in an up-down direction. The lower arm 156 is supported by the support frame portions 54a, 56a pivotably in an up-down direction at a lower position than the upper arm 154. More specifically, the upper arm 154 is supported at substantially intermediate regions in an up-down direction of the support frame portions 54a, 56a, whereas the lower arm 156 is supported by lower end regions of the support frame portions 54a, 56a. The shock absorber 152 connects the main frame portion 16a and the arm portion 150 (lower arm 156 in the present preferred embodiment) to each other. More specifically, the shock absorber 152 has an upper end region supported pivotably by an end region (left end region in the present preferred embodiment) of the cross member 58, whereas the shock absorber 152 has a lower end region supported pivotably by the lower arm 156.

Referring to FIG. 10 and FIG. 12, the suspension assembly 98b is symmetrical with the suspension assembly 98a in a left-right direction, and includes an arm portion 160 and a shock absorber 162. In the present preferred embodiment, the arm portion 160 includes an upper arm 164, a lower arm 166 and a knuckle arm 168. Referring to FIG. 9, the upper arm 164 is supported by the support frame portions 54b, 56b pivotably in an up-down direction. The lower arm 166 is supported by the support frame portions 54b, 56b pivotably in an up-down direction at a lower position than the upper arm 164. More specifically, the upper arm 164 is supported at substantially intermediate regions in an up-down direction of the support frame portions 54b, 56b, whereas the lower arm 166 is supported by lower end regions of the support frame portions 54b, 56b. The shock absorber 162 connects the main frame portion 16a and the arm portion 160 (lower arm 166 in the present preferred embodiment) to each other. More specifically, the shock absorber 162 has an upper end region supported pivotably by another end region (right end region in the present preferred embodiment) of the cross member 58, whereas the shock absorber 162 has a lower end region supported pivotably by the lower arm 166.

Referring to FIG. 10, the rear stabilizer 102 is at a more forward position than the shock absorbers 152, 162, and connects the arm portion 150 of the suspension assembly 98a and the arm portion 160 of the suspension assembly 98b to each other. In the present preferred embodiment, the rear stabilizer 102 connects the upper arm 154 and the upper arm 164 to each other.

Referring to FIG. 10 and FIG. 12, the rotation transmission portion 100 includes a differential device 170, a pair of drive shafts 172a, 172b, a pair of constant-velocity joints 174a, 174b, and a pair of axles 176a, 176b. The differential device 170 is between the suspension assembly 98a and the suspension assembly 98b in the width direction of the vehicle 10. The differential device 170 is supported by the main frame portion 16a. The differential device 170 is connected to the engine 178 (see FIG. 13) which will be described later, via a propeller shaft 182 (see FIG. 13) which will be described later.

The drive shafts 172a, 172b connects the differential device 170 with the constant-velocity joints 174a, 174b. The constant-velocity joint 174a and the axle 176a are connected to each other and are supported rotatably by the knuckle arm 158. The constant-velocity joint 174b and the axle 176b are connected to each other and are supported rotatably by the knuckle arm 168. The axle 176a supports the left rear wheel 14 (see FIG. 5), whereas the axle 176b supports the right rear wheel 14 (see FIG. 5).

Figure 13:
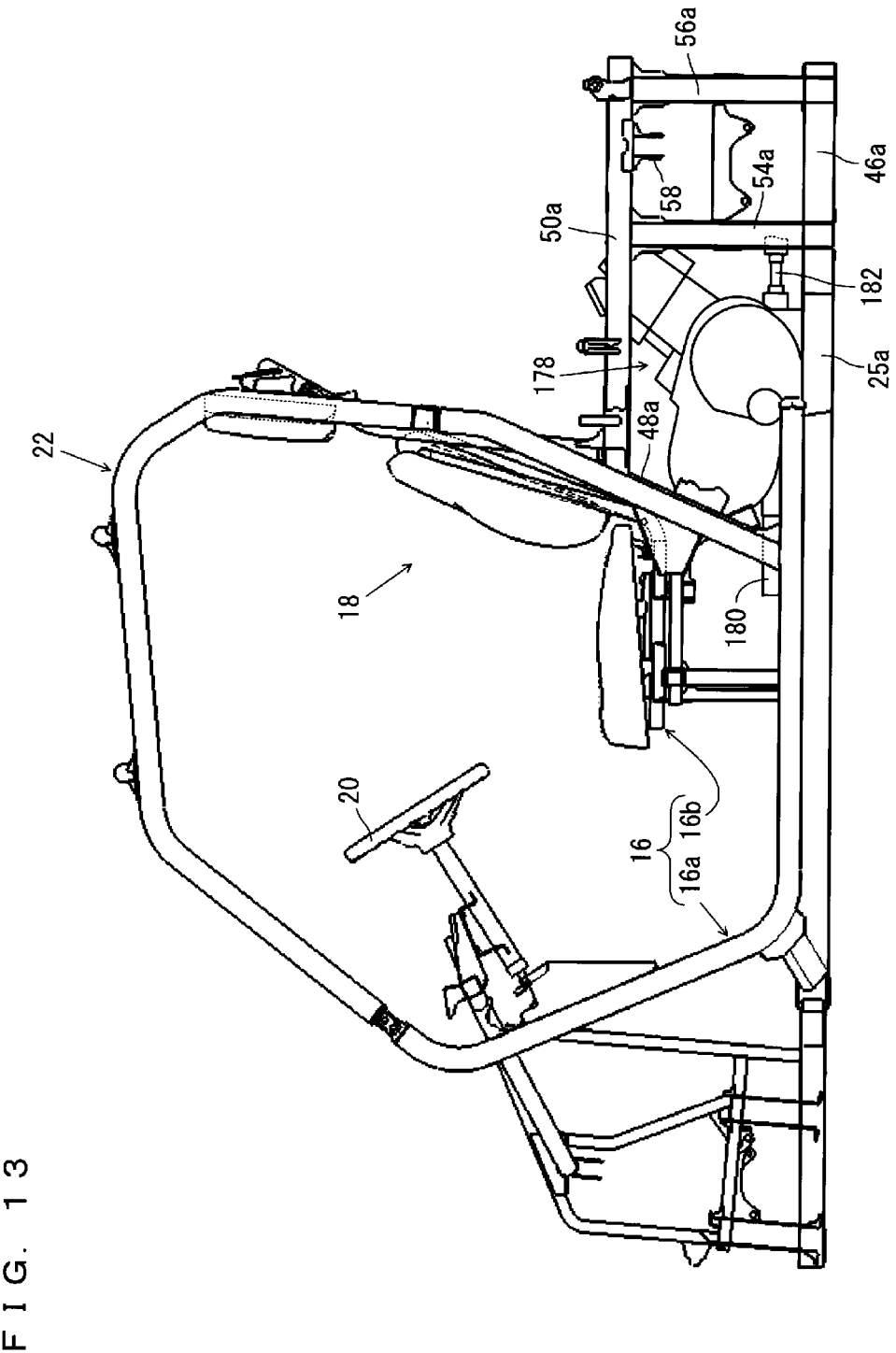
FIG. 13 is a side view showing the frame portion, the seat unit, the steering wheel, the roll-over protection cage, an engine and a pair of propeller shafts.
Figure 14:
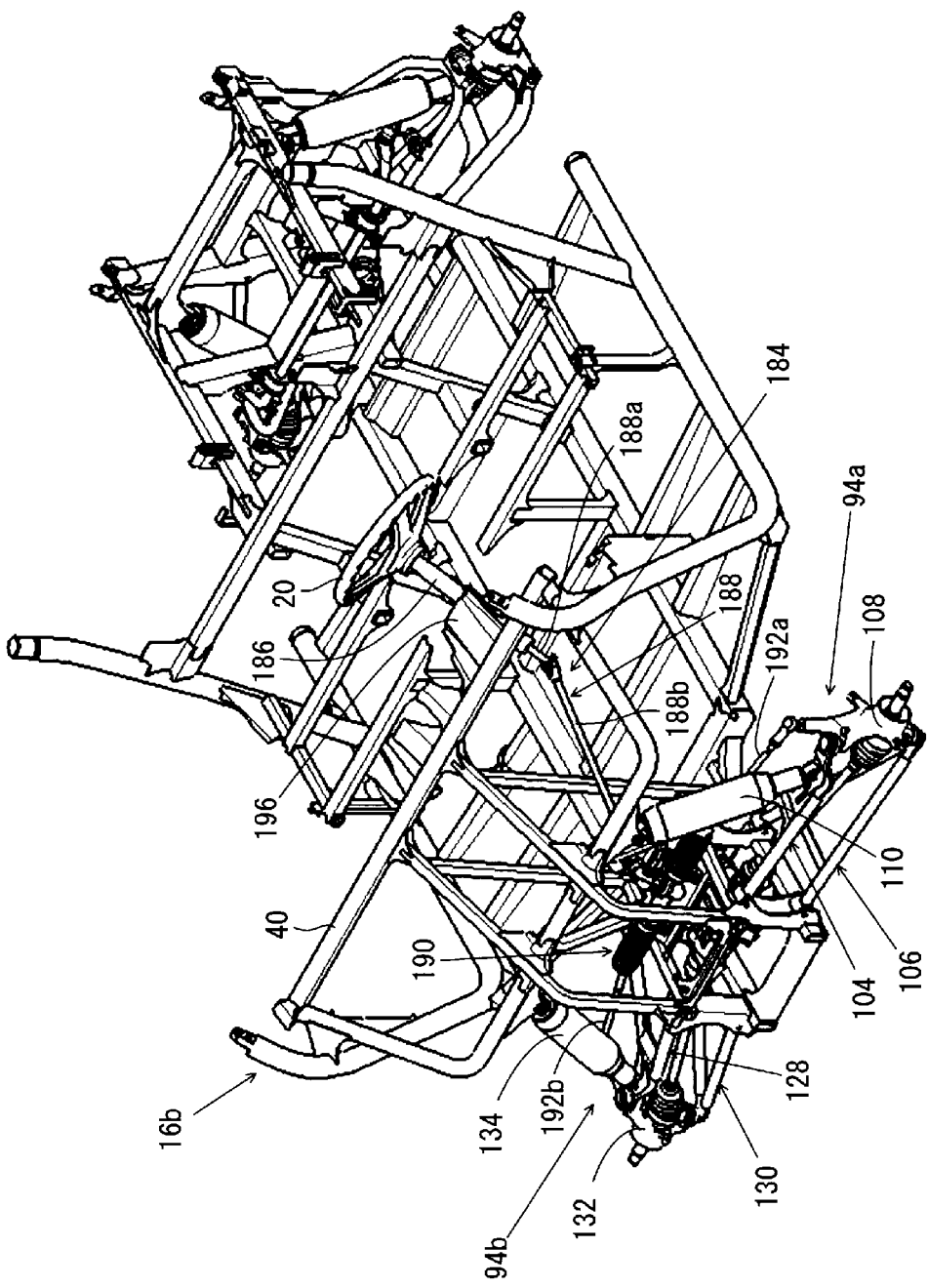
FIG. 14 is a perspective view of the main frame portion, showing a state where the steering wheel and a transfer mechanism are mounted thereon.
Figure 15:
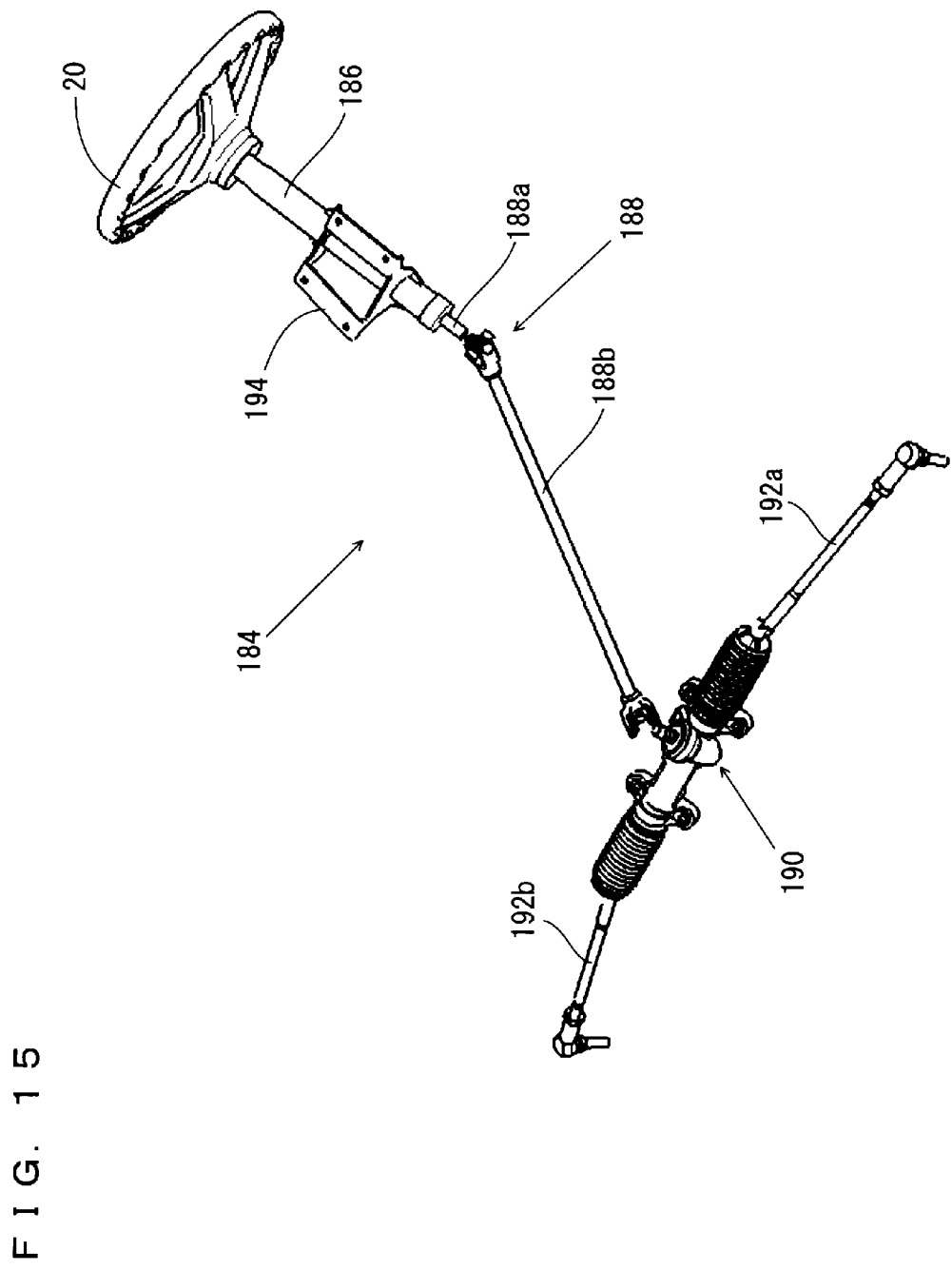
FIG. 15 is a perspective view of the steering wheel and the transfer mechanism.
Figure 16:
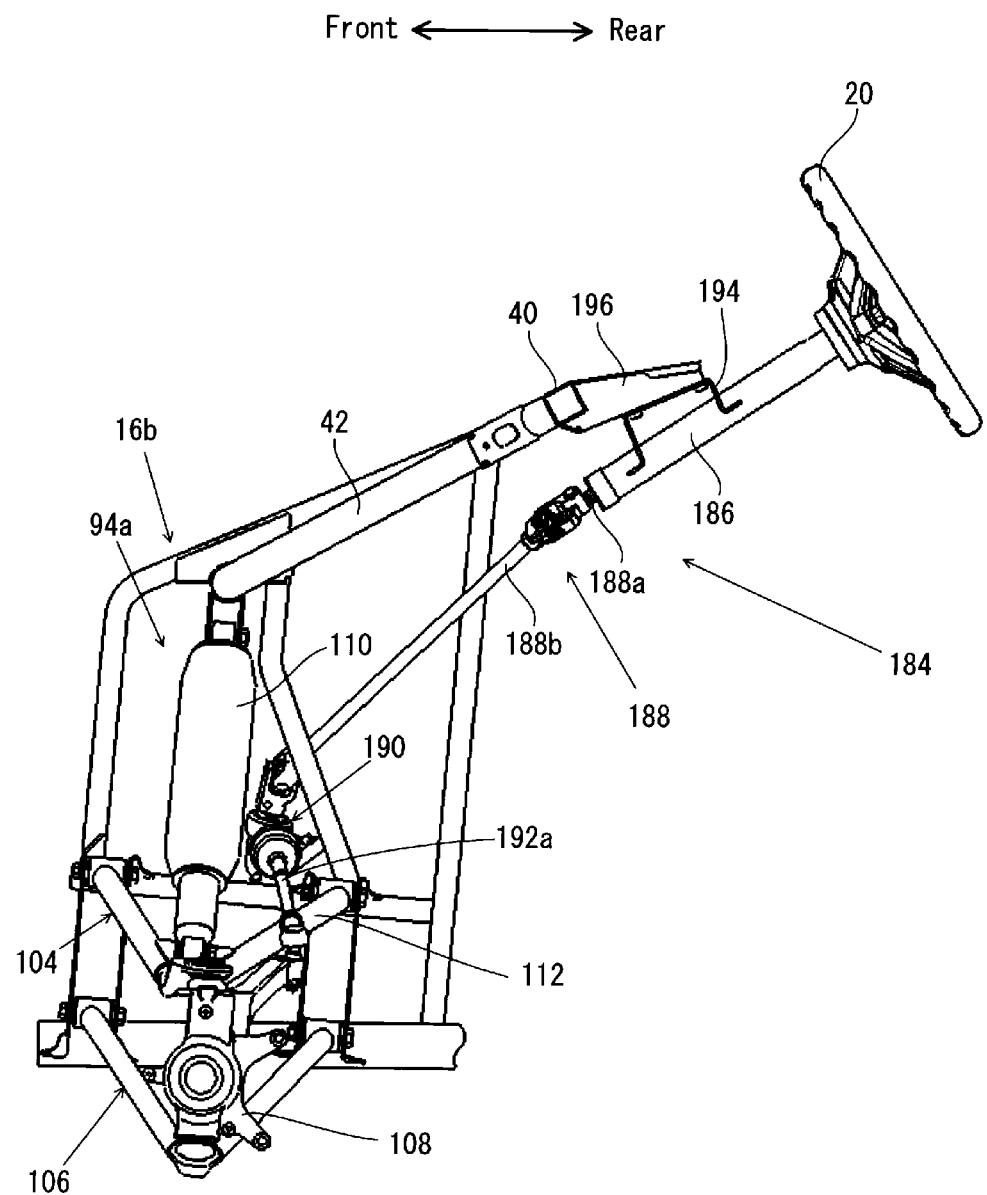
FIG. 16 is a side view showing an arrangement of the transfer mechanism and its surrounds.
Figure 17:
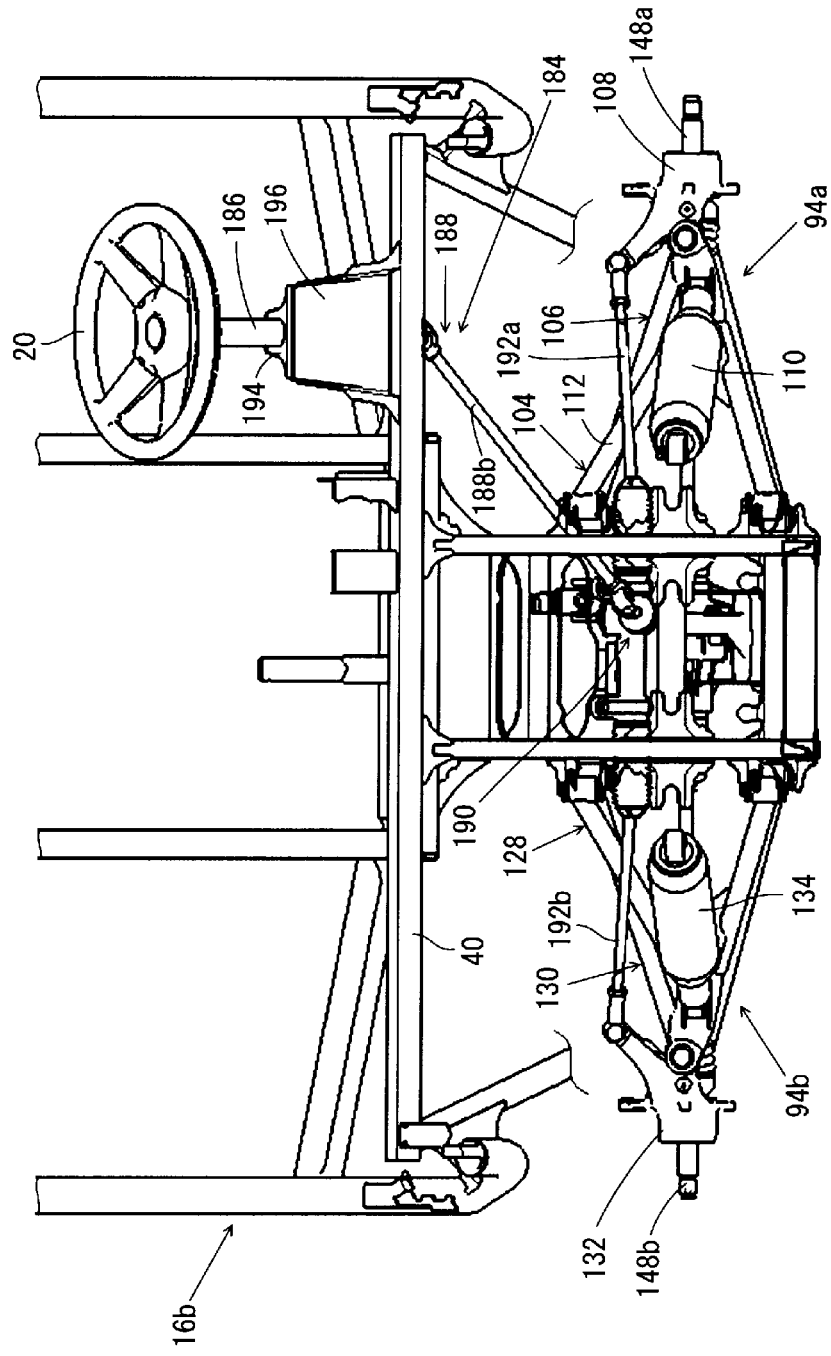
FIG. 17 is a plan view showing the arrangement of the transfer mechanism and its surrounds.

Referring to FIG. 13, the engine 178 is supported at a rearward region of the main frame portion 16a. Referring to FIG. 7 and FIG. 13, a majority of the engine 178 is located within a space surrounded by the side frame portions 25a, 25b, the side frame portions 46a, 46b, the support frame portions 48a, 48b, the side frame portions 50a, 50b, and the support frame portions 54a, 54b. In the present preferred embodiment, at least a portion of the engine 178 is at a more rearward position than the roll-over protection cage 22.

Referring to FIG. 13, the propeller shaft 180 extends forward from a lower end region of the engine 178, whereas the propeller shaft 182 extends rearward from a lower end region of the engine 178. In order to avoid complication in the drawing, the propeller shaft 180 and the propeller shaft 182 are illustrated only partially in FIG. 13.

The propeller shaft 180 is connected to the differential device 142 (see FIG. 10), whereas the propeller shaft 182 is connected to the differential device 170 (see FIG. 10). Referring to FIG. 11 and FIG. 13, rotation from the engine 178 is transmitted by the propeller shaft 180, the differential device 142, the drive shafts 144a, 144b, the constant-velocity joints 146a, 146b, and the axles 148a, 148b, to the pair of front wheels 12. Thus, the pair of front wheels 12 are rotated. Also, referring to FIG. 12 and FIG. 13, rotation from the engine 178 is transmitted by the propeller shaft 182, the differential device 170, the drive shafts 172a, 172b, the constant-velocity joints 174a, 174b, and the axles 176a, 176b, to the pair of rear wheels 14. Thus, the pair of rear wheels 14 are rotated.

Referring to FIG. 14 through FIG. 17, the vehicle 10 further includes a transfer mechanism 184 which transmits movements of the steering wheel 20 to the pair of front wheels 12. The transfer mechanism 184 can be any known rack and pinion type transfer mechanisms, for example. Therefore, the transfer mechanism 184 will be described only briefly. The transfer mechanism 184 includes a steering column portion 186, a steering shaft portion 188, a rack-and-pinion portion 190 and a pair of tie rods 192a, 192b.

The steering column portion 186 is hollow, rotatably supporting the steering wheel 20. The steering column portion 186 is supported by a cross member 40 of the frame portion 16 via brackets 194, 196.

The steering shaft portion 188 includes a first shaft 188a and a second shaft 188b. The first shaft 188a is inserted into the steering column portion 186 rotatably. The first shaft 188a has an upper end region (not illustrated) connected to the steering wheel 20. The first shaft 188a has a lower end region connected to an upper end region of the second shaft 188b.

The second shaft 188b has a lower end region connected to the rack-and-pinion portion 190. Since the rack-and-pinion portion 190 can be any known rack-and-pinion portions, the rack-and-pinion portion 190 will not be described in any more detail. The tie rods 192a, 192b pass behind the shock absorbers 110, 134 and above the upper arms 104, 128, to connect the rack-and-pinion portion 190 with the knuckle arms 108, 132.

Movement of the steering wheel 20 is transmitted through the steering shaft portion 188, the rack-and-pinion portion 190 and the pair of tie rods 192a, 192b, to the knuckle arms 108, 132. Then the knuckle arms 108, 132 pivots in a left-right direction, to steer the pair of front wheels 12.

Figure 18:
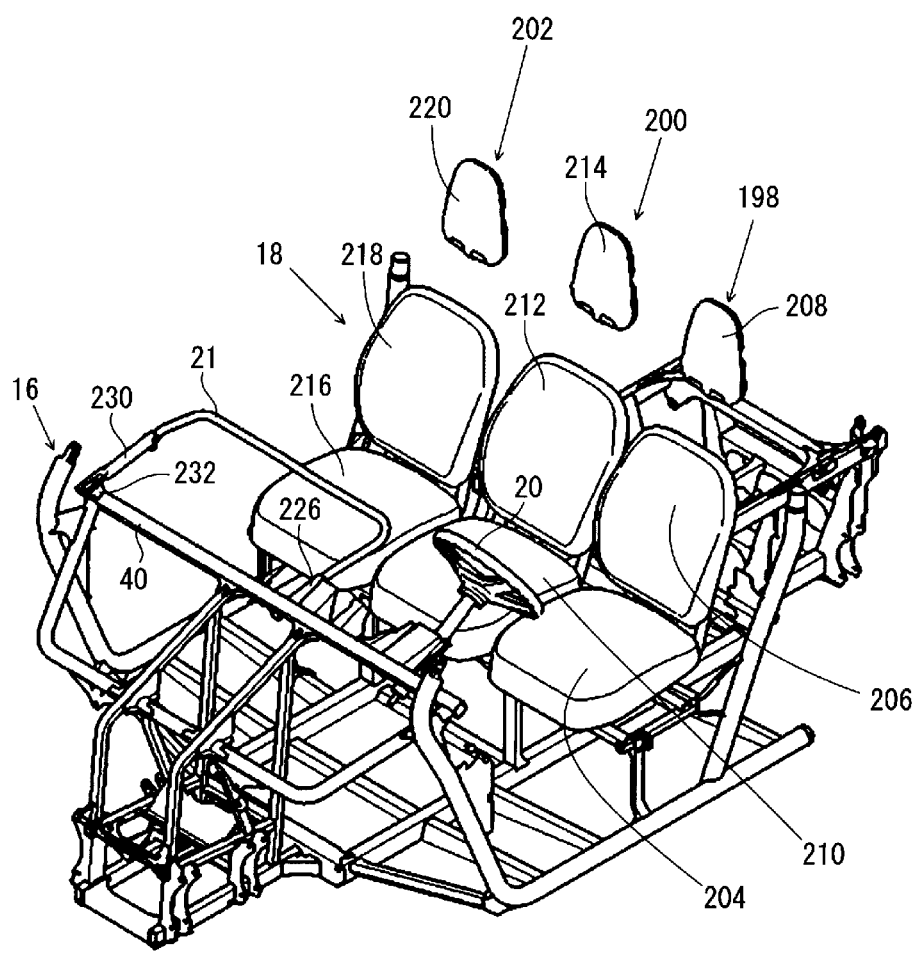
FIG. 18 is a perspective view of the frame portion, the seat unit and the grab bar.

Referring to FIG. 4 and FIG. 18, the seat unit 18 includes a plurality (for example, three in the present preferred embodiment) of seat portions 198, 200, 202 arranged side by side in this order in the width direction of the vehicle 10. In the width direction of the vehicle 10, the seat portion 200 is in the middle of the seat unit 18. In other words, the seat portion 200 is adjacent to the seat portion 198 and is adjacent to the seat portion 202 in the width direction of the vehicle 10. When viewed from the seat portion 200, the seat portion 202 is located on the side spaced away from the seat portion 198. The steering wheel 20 is in front of the seat portion 198. Specifically, in the present preferred embodiment, the seat portion 198 is a seat portion for the driver, whereas the seat portions 200, 202 are seat portions for passengers.

The seat portion 198 includes a seat bottom portion 204, a seat back portion 206 and a headrest portion 208. The seat portion 200 includes a seat bottom portion 210, a seat back portion 212 and a headrest portion 214. The seat portion 202 includes a seat bottom portion 216, a seat back portion 218 and a headrest portion 220. The seat back portions 206, 212, 218 tilt rearward. The seat back portion 212 has a greater rearward tilt angle than the seat back portions 206, 218. The headrest portion 214 is at a more rearward position than the headrest portions 208, 220.

In the present preferred embodiment, the seat portion 198 represents the first seat portion, the seat portion 200 represents the second seat portion and the seat portion 202 represents the third seat portion.

Referring to FIG. 1, FIG. 4 and FIG. 18, a grab bar 21 is provided on a side closer to the seat portion 200 (closer to the seat portion 202) when viewed from the steering wheel 20, in the width direction of the vehicle 10. The grab bar 21 is disposed in front of the seat portion 200 and the seat portion 202.

Figure 19:
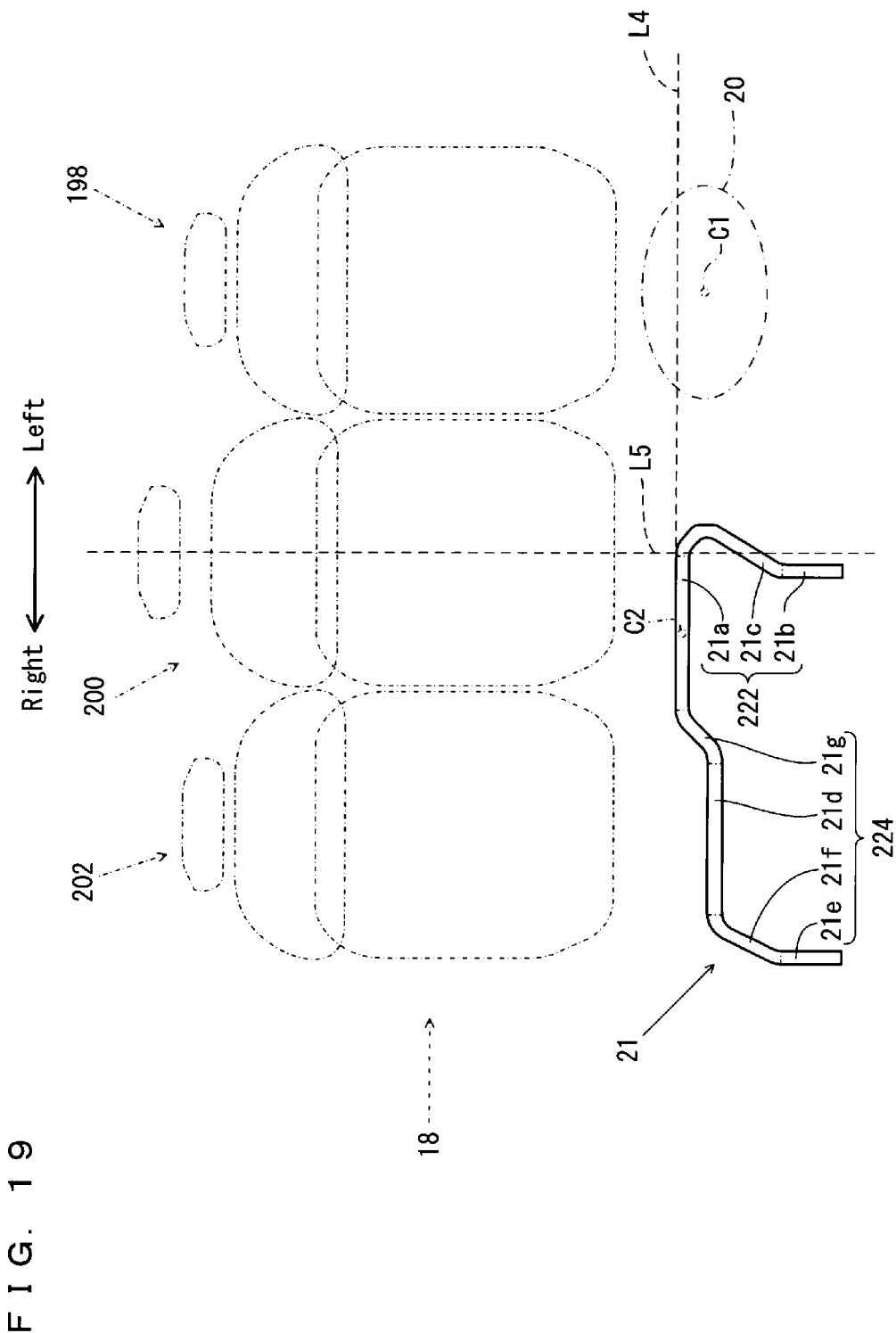
FIG. 19 is a plan view showing a relationship between the seat unit, the steering wheel and the grab bar.

Referring to FIG. 6 and to FIG. 19, the grab bar 21 includes a first grab bar 222 and a second grab bar 224 which are integral with each other. In the present preferred embodiment, the grab bar 21 is provided by a single pipe member. The first grab bar 222 includes a first grip portion 21a, a first mounting portion 21b and a connecting portion 21c. The second grab bar 224 includes a second grip portion 21d, a second mounting portion 21e, a connecting portion 21f and a connecting portion 21g. In the width direction of the vehicle 10, the second mounting portion 21e is on a side away from the steering wheel 20 when viewed from the first mounting portion 21b. In the present preferred embodiment, the first mounting portion 21b is an end region (left end region in the present preferred embodiment) of the grab bar 21, whereas the second mounting portion 21e is another end region (right end region in the present preferred embodiment) of the grab bar 21.

Figure 20:
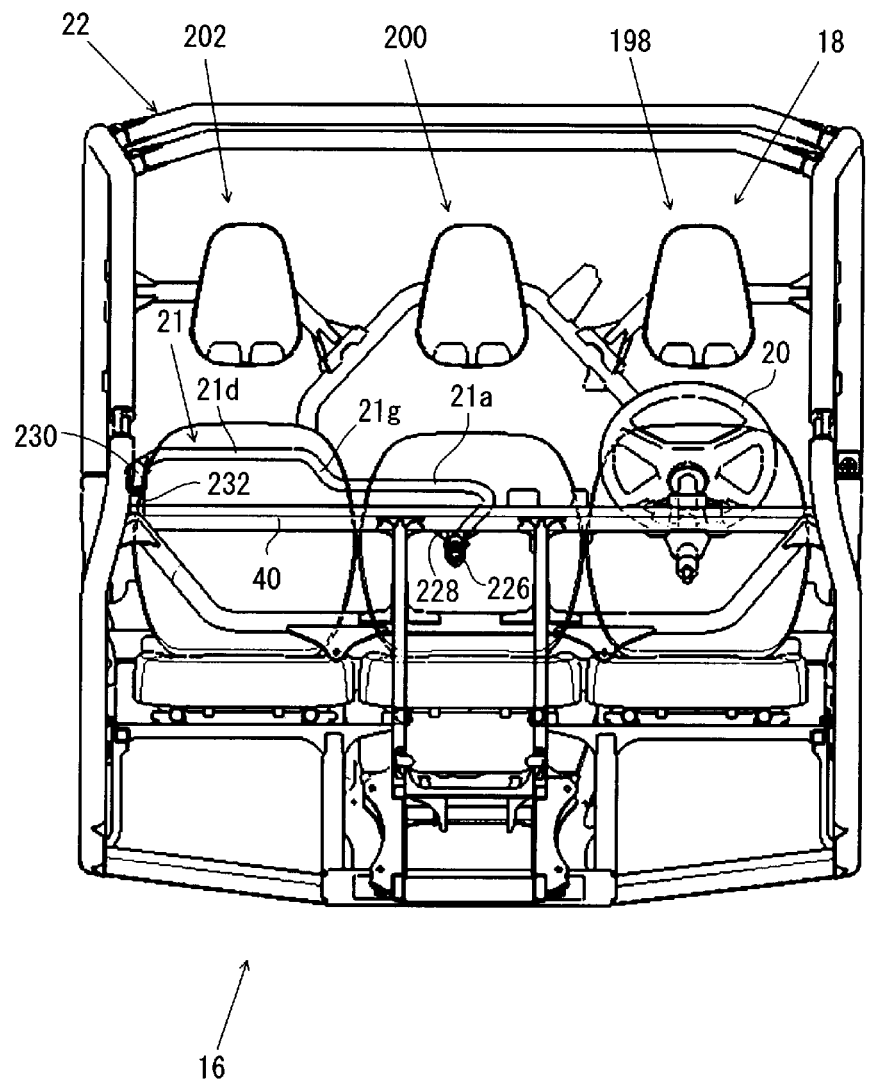
FIG. 20 is a front view showing the frame portion, the seat unit, the steering wheel, the roll-over protection cage and the grab bar.

The first grip portion 21a is in front of the seat portion 200 and extends parallel or substantially parallel to the width direction of the vehicle 10. Referring to FIG. 6, the first mounting portion 21b is inserted into a tubular connecting member 226 at a lower position than the first grip portion 21a. The first mounting portion 21b is fixed to the connecting member 226 with unillustrated fasteners (such as bolts and nuts), for example. Referring to FIG. 20, the connecting member 226 is fixed to the cross member 40 via a bracket 228 which extends downward from a substantially intermediate region of the cross member 40. Thus, the first mounting portion 21b is attached to the frame portion 16 in front of the seat portion 200. Referring to FIG. 6 and to FIG. 19, the connecting portion 21c connects the first grip portion 21a and the first mounting portion 21b to each other. Specifically, the connecting portion 21c extends obliquely in a forwardly downward direction from a left end region of the first grip portion 21a and is connected to a rearward end region of the first mounting portion 21b.

Referring to FIG. 6 and to FIG. 19, the second grip portion 21d is in front of the seat portion 202 and extends parallel or substantially parallel to the width direction of the vehicle 10. The second grip portion 21d is at a higher position than the first grip portion 21a. Referring to FIG. 6, the second mounting portion 21e is inserted into a tubular connecting member 230 at a higher position than the first mounting portion 21b. The second mounting portion 21e is fixed to the connecting member 230 with unillustrated fasteners (such as bolts and nuts), for example.

Referring to FIG. 6, FIG. 18 and to FIG. 20, the connecting member 230 is at a higher position than the connecting member 226. The connecting member 230 is fixed to the cross member 40 via a bracket 232 which extends upward from an end region (right end region in the present preferred embodiment) of the cross member 40. Thus, the second mounting portion 21e is attached to the frame portion 16. With the arrangement described above, the grab bar 21 is fixed to the frame portion 16.

Referring to FIG. 6 and to FIG. 19, the connecting portion 21f connects the second grip portion 21d and the second mounting portion 21e to each other, whereas the connecting portion 21g connects the second grip portion 21d and the first grip portion 21a to each other. Specifically, the connecting portion 21f extends obliquely in a forwardly downward and rightward direction from a right end region of the second grip portion 21d and is connected to a rearward end region of the second mounting portion 21e. Referring to FIG. 20, the connecting portion 21g extends obliquely in a downwardly leftward direction from a left end region of the second grip portion 21d and is connected to the first grip portion 21a.

Referring to FIG. 6, in the present preferred embodiment, the first mounting portion 21b can be fixed to the connecting member 226 at a plurality of positions in a fore-aft direction, whereas the second mounting portion 21e can be fixed to the connecting member 230 at a plurality of positions in a fore-aft direction. Therefore, in the present preferred embodiment, it is possible to adjust in a fore-aft direction the positions to which the first mounting portion 21b and the second mounting portion 21e are attached. This arrangement enables to adjust the position of the grab bar 21 in the fore-aft direction. As has been described earlier, in the present preferred embodiment, the first grab bar 222 and the second grab bar 224 are integral with each other. Therefore, it is possible to move the first grab bar 222 together with the second grab bar 224 in the fore-aft direction. This makes it easy to make position adjustment of the first grab bar 222 and the second grab bar 224.

Figure 21:
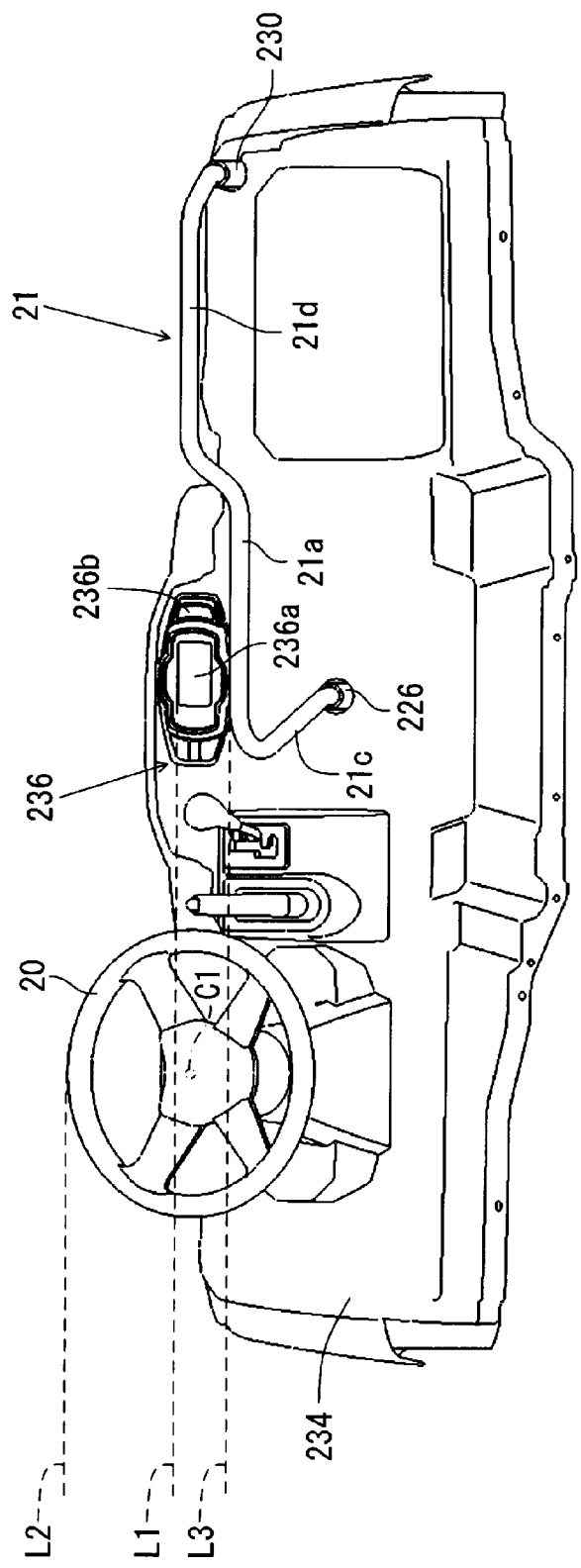
FIG. 21 is a rear view showing the steering wheel, the grab bar, a front panel and a display device.

Referring to FIG. 21, the vehicle 10 further includes a front panel 234 and a display device 236. The front panel 234 is in front of the seat unit 18 (see FIG. 20) and is supported by the cross member 40 (see FIG. 20). The front panel 234 can be any known element, so no details will be described here.

The display device 236 is at an upper, intermediate region of the front panel 234. The display device 236 includes a display portion 236a which shows information about the traveling state of the vehicle 10, and an operation portion 236b for use to select kinds of information to be displayed in the display portion 236a. The display portion 236a can be any appropriate one selected from liquid-crystal display units, LED display units, etc. The operation portion 236b includes, for example, a plurality of operation buttons (not illustrated).

In the width direction of the vehicle 10, the display portion 236a is on a side closer to the seat portion 202 (see FIG. 20) when viewed from the steering wheel 20. In the present preferred embodiment, the display portion 236a is in front of the seat portion 200 (see FIG. 20).

The display portion 236a has its upper end (see broken line L1) at a lower position than an upper end (see broken line L2) of the steering wheel 20. At least a portion of the connecting portion 21c is at a lower position than the upper end of the display portion 236a. In the present preferred embodiment, the entire connecting portion 21c is at a lower position than the upper end of the display portion 236a. The first grip portion 21a is at a lower position than the upper end of the display portion 236a. The first grip portion 21a has its upper end (see broken line L3) at a lower position than a center C1 of the steering wheel 20. The connecting portion 21c extends obliquely from the first grip portion 21a in a forward and downward direction, toward the seat portion 202 side (rightward in the present preferred embodiment) relative to a left end region of the first grip portion 21a, and is connected to a rearward end region of the first mounting portion 21b. This arrangement makes it possible to extend the first grip portion 21a from a position in front of the seat portion 202 to a vicinity of a center line of the seat portion 200 in a left-right direction while preventing the grab bar 21 from obstructing the driver's view when looking at the display portion 236a.

Referring to FIG. 19, the first grip portion 21a is at a more rearward position than the second grip portion 21d. The first grip portion 21a has its rear end (see broken line L4) at a more rearward position than the center C1 of the steering wheel 20. At least a portion of the first grip portion 21a is on a side closer to the seat portion 202 than a center line (see broken line L5) of the seat portion 200 in a left-right direction (the width direction of the vehicle 10). In other words, in the width direction of the vehicle 10, at least a portion of the first grip portion 21a is on the side closer to the seat portion 202 when viewed from the center position of the seat portion 200 in the left-right direction. In the present preferred embodiment, the first grip portion 21a includes a center C2, which is on a side closer to the seat portion 202 than the center of the seat portion 200 in the left-right direction. In other words, in the width direction of the vehicle 10, the center C2 of the first grip portion 21a is on the side closer to the seat portion 202 when viewed from the center position of the seat portion 200 in the left-right direction.

Hereinafter, functions and advantages of the vehicle 10 will be described.

In the vehicle 10, in the width direction of the vehicle 10 when viewed from the steering wheel 20, the grab bar 21 is on the side closer to the seat portion 202. The grab bar includes the first grip portion 21a in front of the seat portion 200. In this case, a passenger who is sitting in the seat portion 200 can hold the first grip portion 21a easily. Therefore, even if the vehicle 10 makes rocking motion, the passenger sitting in the seat portion 200 can grab the first grip portion 21a so as to reduce or prevent his/her sway. As a result, this arrangement provides a comfortable ride for the passenger sitting in the seat portion 200.

According to the vehicle 10, the display portion 236a has its upper end at a lower position than the upper end of the steering wheel 20, and therefore the driver sees the display portion 236a from an obliquely upper position. On the other hand, the first grip portion 21a is also at a lower position than the upper end of the display portion 236a, so this arrangement makes it possible to prevent the first grip portion 21a from being obstructive when the driver looks at the display portion 236a.

The first mounting portion 21b is at a lower position than the first grip portion 21a. This makes it possible to position at least a portion of the connecting portion 21c, which connects the first grip portion 21a and the first mounting portion 21b to each other, at a lower position than the first grip portion 21a. Therefore, it is possible to position at least a portion of the connecting portion 21c at a lower position than the upper end of the display portion 236a so that the grab bar 21 will not become obstructive when the driver looks at the display portion 236a.

The first grip portion 21a has its rear end at a more rearward position than the center C1 of the steering wheel 20. In this case, this arrangement prevents the driver's arm and hand on the steering wheel 20 from contacting with the passenger's arm and hand on the first grip portion 21a. This provides the driver with undisturbed operation of the vehicle 10, while it also provides a more comfortable ride to the passenger sitting in the seat portion 200.

The first grip portion 21a has its upper end at a lower position than the center C1 of the steering wheel 20. In this case, this arrangement prevents the driver's arm and hand on the steering wheel 20 from contacting with the passenger's arm and hand on the first grip portion 21a. This provides the driver with undisturbed operation of the vehicle 10, while it also provides a more comfortable ride to the passenger sitting in the seat portion 200.

At least a portion of the first grip portion 21a is on the side closer to the seat portion 202 than the center line of the seat portion 200 in a left-right direction. In this case, the passenger sitting in the seat portion 200 can grab a portion of the first grip portion 21a which is on the side closer to the seat portion 202 than the center line of the seat portion 200 in a left-right direction. This arrangement prevents the driver's arm and hand on the steering wheel 20 from contacting with the passenger's arm and hand on the first grip portion 21a. As a result, the driver can drive the vehicle 10 without disturbance, while the passenger sitting in the seat portion 200 can enjoy a more comfortable ride.

The center C2 of the first grip portion 21a is on a side closer to the seat portion 202 than the center line of the seat portion 200 in the left-right direction. In this case, the passenger's arm and hand grabbing the first grip portion 21a is on a side closer to the seat portion 202, so that this arrangement prevents the driver's arm and hand on the steering wheel 20 from contacting with the passenger's arm and hand on the first grip portion 21a.

The second grip portion 21d is at a higher position than the first grip portion 21a. In this case, sufficient space is provided below the second grip portion 21d. This provides an advantage such that when a passenger is getting on the vehicle from the side of the seat portion 202 to sit in the seat portion 200, for example, the second grip portion 21d is not obstructive. Likewise, the second grip portion 21d is not obstructive when the passenger leaves the seat portion 200 and passes by the seat portion 202 to get off the vehicle 10. As a result, the passenger can easily get on/off the vehicle 10 when sitting in/leaving from the seat portion 200. The first grip portion 21a and the second grip portion 21d preferably are at different heights from each other. This also prevents the passenger's arm and hand on the first grip portion 21a from contacting with the other passenger's arm and hand on the second grip portion 21d. This provides a more comfortable ride to the passengers sitting in the seat portion 200 and the seat portion 202.

The grab bar 21 includes a first mounting portion 21b and a second mounting portion 21e, each attached to the frame portion 16. In this case, it is possible to attach the grab bar 21 to the frame portion 16 at least at two locations thereof. This arrangement allows the grab bar 21 to be fixed strongly to the frame portion 16. Also, when viewed from the first mounting portion 21b, in the width direction of the vehicle 10, the second mounting portion 21e is on a side spaced away from the steering wheel 20 and is at a higher position than the first mounting portion 21b. The arrangements described thus far make it possible to prevent the second mounting portion 21e from being obstructive to the passenger who is trying to get on/off the vehicle 10 from the side of the seat portion 202. This makes it easier for the passenger to get on/off the vehicle 10.

The first grip portion 21a is preferably at a more rearward position than the second grip portion 21d. In this case, the first grip portion 21a and the second grip portion 21d are located at different positions from each other in a fore-aft direction, and therefore this arrangement prevents the passenger's arm and hand on the first grip portion 21a from contact the other passenger's arm and hand on the second grip portion 21d. This provides a more comfortable ride to passengers sitting in the seat portion 200 and the seat portion 202.

The first grab bar 222 and the second grab bar 224 preferably are integral with each other. In this case, arrangement enables to provide the first grab bar 222 for the seat portion 200 and the second grab bar 224 for the seat portion 202 while reducing complication in the vehicle configuration.

Figure 22:
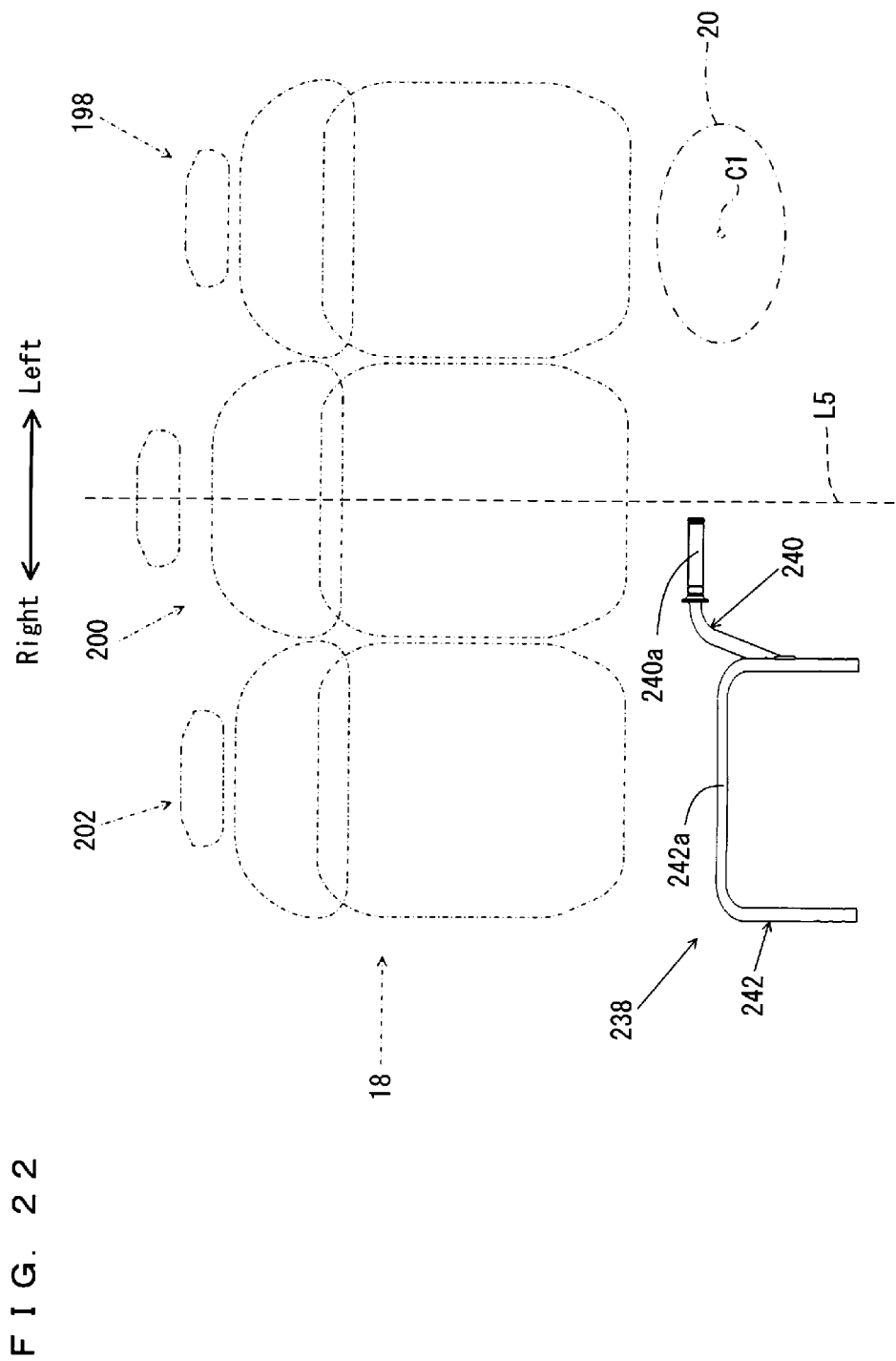
FIG. 22 is a plan view showing a relationship between the seat unit, the steering wheel and a grab bar of a different design.

In the preferred embodiment described above, description was made for a case where the vehicle 10 preferably includes a grab bar 21 which is provided by a single pipe member. However, the vehicle may have a grab bar constituted by a plurality of members. For example, referring to FIG. 22, a grab bar 238 preferably includes a first grab bar 240 and a second grab bar 242. The grab bar 238 is on a side closer to the seat portion 200 (side closer to the seat portion 202) in the width direction of the vehicle 10 when viewed from the steering wheel 20. The first grab bar 240 and the second grab bar 242 preferably are separate members from each other. The first grab bar 240 includes a pipe member, for example, and the second grab bar 242 includes a pipe member, for example. The second grab bar 242 has a shape of an inverted letter of U or substantially a shape of an inverted letter of U in a plan view. The second grab bar 242 has its forward end regions (two end regions) attached to the cross member 40 (see FIG. 18), for example. The first grab bar 240 is attached to a left side region of the second grab bar 242 and extends obliquely in a leftward and rearward direction from the second grab bar 242.

The first grab bar 240 includes the first grip portion 240a in front of the seat portion 200, whereas the second grab bar 242 includes the second grip portion 242a in front of the seat portion 202. The first grip portion 240a has its center on a side closer to the seat portion 202 than the center line (see broken line L5) of the seat portion 200 in a left-right direction. In the present preferred embodiment, the entire first grip portion 240a is on a side closer to the seat portion 202 than the center line of the seat portion 200 in the left-right direction. The first grip portion 240a is at a more rearward position than the second grip portion 242a. The first grip portion 240a has its rear end at a more rearward position than the center C1 of the steering wheel 20.

The first grip portion 240a, the second grip portion 242a, the steering wheel 20 and the display portion 236a (see FIG. 21) are in the same positional relationship in an up-down direction as the relationship of the first grip portion 21a, the second grip portion 21d, the steering wheel 20 and the display portion 236a.

According to the vehicle which includes the grab bar 238, the passenger sitting in the seat portion 200 can easily hold on the first grip portion 240a, whereas the passenger sitting in the seat portion 202 can easily hold on the second grip portion 242a. Thus, this arrangement provides the passengers with a comfortable ride.

In the preferred embodiment described above, description was made for a case where the seat unit 18 preferably includes a plurality of seat portions 198, 200, 202 which are made individually from each other. However, the seat unit may include a plurality of seat portions which preferably are integral with each other. Therefore, various preferred embodiments of the present invention are also applicable to vehicles which include a bench seat.

In the preferred embodiment described above, description was made for a case where the seat back portion and the headrest portion preferably are made independently from each other. However, the seat back portion and the headrest portion may be made integral with each other.

In the preferred embodiment described above, description was made for a case where the seat unit 18 preferably includes three seat portions 198, 200, 202. However, the number of the seat portions in the seat unit is not limited to the preferred embodiment described above. For example, the seat unit may include four or more seat portions, for example.

In the preferred embodiment described above, description was made for a case where the vehicle 10 preferably includes one seat unit 18. However, the vehicle may include a plurality (two, for example) of seat units arranged in a fore-aft direction.

In the preferred embodiment described above, description was made for a case where the vehicle 10 preferably includes a pair of rear wheels 14. However, the vehicle may include two or more pairs of rear wheels.

In the preferred embodiment described above, description was made for a case where the first mounting portion 21b and the second mounting portion 21e of the grab bar 21 are preferably attached to the cross member 40 via the connecting members 226, 230. However, the first mounting portion 21b and the second mounting portion 21e of the grab bar 21 may be attached to other regions in the main frame portion 16a than the cross member 40. Likewise, the second grab bar 242 of the grab bar 238 may have its forward end region attached to other regions in the main frame portion 16a than the cross member 40.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
a pair of front wheels;
at least a pair of rear wheels;
a frame portion supported by the pair of front wheels and the pair of rear wheels;
a first seat portion, a second seat portion and a third seat portion supported by the frame portion and disposed side by side in this order in a width direction of the vehicle;
a steering wheel in front of the first seat portion; and
a grab bar at least a portion of which is disposed directly in front of the third seat portion; wherein
the grab bar includes a first grip portion directly in front of the second seat portion.

2. The vehicle according to claim 1, further comprising a display device directly in front of the second seat portion to display information about the traveling state of the vehicle; wherein
- the display device includes an upper end at a lower position than an upper end of the steering wheel; and
- the first grip portion is at a lower position than the upper end of the display device.

3. The vehicle according to claim 1, wherein the first grip portion includes a rear end at a more rearward position than a center of the steering wheel.

4. The vehicle according to claim 1, wherein the first grip portion includes an upper end at a lower position than a center of the steering wheel.

5. The vehicle according to claim 1, wherein at least a portion of the first grip portion is on a side closer to the third seat portion than a center line of the second seat portion in the width direction.

6. The vehicle according to claim 5, wherein the first grip portion includes a center on a side closer to the third seat portion than the center line.

7. The vehicle according to claim 1, wherein the grab bar includes a second grip portion directly in front of the third seat portion; and
- the first grip portion is at a more rearward position than the second grip portion.

8. The vehicle according to claim 7, wherein
- the grab bar includes a first grab bar including the first grip portion and a second grab bar including the second grip portion; and
- the first grab bar and the second grab bar are integral with each other.

9. A vehicle comprising:
- a pair of front wheels;
- at least a pair of rear wheels;
- a frame portion supported by the pair of front wheels and the pair of rear wheels;
- a first seat portion, a second seat portion and a third seat portion supported by the frame portion and disposed side by side in this order in a width direction of the vehicle;
- a steering wheel in front of the first seat portion; and
- a grab bar at least a portion of which is disposed directly in front of the third seat portion; wherein
- the grab bar includes a first grip portion in front of the second seat portion;
- the grab bar further includes a first mounting portion attached to the frame portion in front of the second seat portion and a connecting portion connecting the first grip portion and the first mounting portion to each other; and
- the first mounting portion is at a lower position than the first grip portion.

10. A vehicle comprising:
- a pair of front wheels;
- at least a pair of rear wheels;
- a frame portion supported by the pair of front wheels and the pair of rear wheels;
- a first seat portion, a second seat portion and a third seat portion supported by the frame portion and disposed side by side in this order in a width direction of the vehicle;
- a steering wheel in front of the first seat portion; and
- a grab bar at least a portion of which is disposed directly in front of the third seat portion; wherein
- the grab bar includes a first grip portion in front of the second seat portion;
- the grab bar includes a second grip portion in front of the third seat portion; and
- the second grip portion is at a higher position than the first grip portion.

11. The vehicle according to claim 10, wherein
- the grab bar includes a first mounting portion attached to the frame portion and a second mounting portion disposed on a side of the vehicle spaced away from the steering wheel in the width direction of the vehicle when viewed from the first mounting portion and attached to the frame portion; and
- the second mounting portion is at a higher position than the first mounting portion.

12. The vehicle according to claim 10, wherein
- the grab bar includes a first grab bar including the first grip portion and a second grab bar including the second grip portion; and
- the first grab bar and the second grab bar are integral with each other.

13. A vehicle comprising:
- a pair of front wheels;
- at least a pair of rear wheels;
- a frame portion supported by the pair of front wheels and the pair of rear wheels;
- a driver seat portion and a passenger seat portion supported by the frame portion and disposed in a width direction of the vehicle, the passenger seat portion being located on a side of the vehicle spaced away from the driver seat portion;
- a steering wheel in front of the driver seat portion; and
- a grab bar at least a portion of which is disposed directly in front of the passenger seat portion; wherein
- the grab bar includes a first grip portion disposed to cross a center line of the vehicle in the width direction.

14. The vehicle according to claim 13, wherein the first grip portion includes a rear end at a more rearward position than a center of the steering wheel.

15. The vehicle according to claim 13, wherein the first grip portion includes an upper end at a lower position than a center of the steering wheel.

16. The vehicle according to claim 13, wherein at least a portion of the first grip portion is on a side of the vehicle closer to the passenger seat portion than the center line of the vehicle in the width direction.

17. The vehicle according to claim 16, wherein the first grip portion includes a center on a side closer to the passenger seat portion than the center line.

18. The vehicle according to claim 13, wherein
- the grab bar includes a first mounting portion attached to the frame portion and a second mounting portion disposed on a side of the vehicle spaced away from the steering wheel in the width direction of the vehicle when viewed from the first mounting portion and attached to the frame portion; and
- the second mounting portion is at a higher position than the first mounting portion.

19. The vehicle according to claim 13, wherein
- the grab bar includes a second grip portion directly in front of the passenger seat portion; and
- the first grip portion is at a more rearward position than the second grip portion.

* * * * *